(12) United States Patent
Shimizu et al.

(10) Patent No.: US 10,838,287 B2
(45) Date of Patent: Nov. 17, 2020

(54) COOLING DEVICE AND PROJECTOR

(71) Applicant: SEIKO EPSON CORPORATION, Tokyo (JP)

(72) Inventors: Katsuya Shimizu, Saku (JP); Norio Imaoka, Shimoina-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/558,674

(22) Filed: Sep. 3, 2019

(65) Prior Publication Data

US 2020/0073217 A1  Mar. 5, 2020

(30) Foreign Application Priority Data

Sep. 4, 2018  (JP) .................................. 2018-165267

(51) Int. Cl.
 G03B 21/16 (2006.01)
 F28D 15/02 (2006.01)
 F28D 15/04 (2006.01)
 F28D 20/02 (2006.01)
 H04N 9/31 (2006.01)

(52) U.S. Cl.
 CPC ......... *G03B 21/16* (2013.01); *F28D 15/0266* (2013.01); *F28D 15/043* (2013.01); *F28D 15/046* (2013.01); *F28D 20/023* (2013.01); *H04N 9/3144* (2013.01)

(58) Field of Classification Search
 CPC .... G03B 21/16; H04N 9/3144; F28D 15/043; F28D 15/046; F28D 15/0266; F28D 20/023
 See application file for complete search history.

(56) References Cited

U.S. PATENT DOCUMENTS

| 6,863,117 | B2 * | 3/2005 | Valenzuela | ......... F28D 15/0233 165/104.21 |
| 7,775,261 | B2 * | 8/2010 | Valenzuela | ........... F28D 15/043 165/104.26 |
| 8,596,341 | B2 * | 12/2013 | Tegrotenhuis | ...... F28D 15/0233 165/104.26 |

(Continued)

FOREIGN PATENT DOCUMENTS

| JP | 2006-275424 A | 10/2006 |
| JP | 2008-522129 A | 6/2008 |

(Continued)

*Primary Examiner* — Bao-Luan Q Le
(74) *Attorney, Agent, or Firm* — Oliff PLC

(57) ABSTRACT

A cooling device includes an evaporator, a condenser, a vapor pipe, and a liquid pipe. The evaporator includes a housing having a reservoir, a wick disposed in the housing and retaining the working fluid in the liquid phase, and a groove member having a plurality of flow channels through which the working fluid in the vapor phase flows. The wick has first, second and third layers. The first layer has a plurality of first apertures, and is higher in thermal conductivity than both the second and third layers. The third layer transports the working fluid in the liquid phase in the reservoir to the second layer. The second layer has a plurality of second apertures corresponding to the first apertures, the second apertures having aperture area larger than corresponding one of the first apertures. The second layer transports the working fluid in the liquid phase to the first layer.

14 Claims, 10 Drawing Sheets

(56) References Cited

U.S. PATENT DOCUMENTS

| | | | |
|---|---|---|---|
| 10,515,871 B1* | 12/2019 | Joshi | H01L 23/367 |
| 10,524,388 B2* | 12/2019 | Machida | F28D 15/043 |
| 10,634,397 B2* | 4/2020 | Fisher | F28F 13/185 |
| 10,660,236 B2* | 5/2020 | Rush | H05K 7/20336 |
| 10,704,838 B2* | 7/2020 | Machida | H01L 21/4882 |
| 2003/0159809 A1* | 8/2003 | Valenzuela | F28D 15/0233 |
| | | | 165/104.26 |
| 2005/0230085 A1* | 10/2005 | Valenzuela | F28D 15/0233 |
| | | | 165/104.26 |
| 2006/0162906 A1* | 7/2006 | Hong | F28D 15/046 |
| | | | 165/104.26 |
| 2006/0162907 A1* | 7/2006 | Wu | F28D 15/046 |
| | | | 165/104.26 |
| 2006/0196640 A1* | 9/2006 | Siu | H01L 23/433 |
| | | | 165/104.26 |
| 2006/0213061 A1* | 9/2006 | Wu | H01L 21/4882 |
| | | | 29/890.032 |
| 2007/0240860 A1* | 10/2007 | Meyer, IV | F28D 15/0233 |
| | | | 165/104.26 |
| 2009/0321053 A1* | 12/2009 | Tegrotenhuis | F25B 37/00 |
| | | | 165/104.26 |
| 2010/0018678 A1* | 1/2010 | Siu | F28D 15/046 |
| | | | 165/104.26 |
| 2010/0157535 A1* | 6/2010 | Oniki | H05K 7/20336 |
| | | | 361/700 |
| 2010/0326632 A1* | 12/2010 | Nagai | F28F 3/086 |
| | | | 165/104.26 |
| 2014/0311706 A1* | 10/2014 | Tenzler | B01L 7/52 |
| | | | 165/61 |
| 2015/0289413 A1* | 10/2015 | Rush | F28D 15/046 |
| | | | 361/700 |
| 2016/0259383 A1* | 9/2016 | Shioga | G06F 1/203 |
| 2017/0082326 A1* | 3/2017 | Fisher | F25B 49/00 |
| 2018/0058767 A1* | 3/2018 | Machida | F28D 15/0233 |
| 2019/0090385 A1* | 3/2019 | Machida | F28D 15/046 |
| 2019/0239395 A1* | 8/2019 | Joshi | H01L 23/427 |
| 2020/0232684 A1* | 7/2020 | Fisher | H01L 23/4735 |

FOREIGN PATENT DOCUMENTS

| | | |
|---|---|---|
| JP | 2010-151354 A | 7/2010 |
| JP | 2012-083082 A | 4/2012 |

* cited by examiner

COOLING DEVICE AND PROJECTOR

The present application is based on, and claims priority from JP Application Serial Number 2018-165267, filed Sep. 4, 2018, the disclosure of which is hereby incorporated by reference herein in its entirety.

BACKGROUND

1. Technical Field

The present disclosure relates to a cooling device and a projector.

2. Related Art

In the past, as a cooling device used for cooling of an electronic apparatus and so on, there has been known a loop heat pipe for transporting heat using a change in phase of a working fluid encapsulated inside (see, e.g., JP-A-2012-83082 (Document 1)).

The loop heat pipe described in Document 1 is provided with an evaporator, a condenser, a vapor pipe and a liquid pipe. The evaporator receives heat from a heat generator to evaporate the working fluid in the liquid phase to change the phase of the working fluid to the vapor phase. The vapor pipe makes the working fluid having changed in phase to the vapor phase in the evaporator flow through the condenser. The condenser condenses the working fluid in the vapor phase due to heat radiation to perform a phase change from the working fluid in the vapor phase to the working fluid in the liquid phase. The liquid pipe makes the working fluid having changed in phase to the liquid phase in the condenser flow through the evaporator.

As described above, by the working fluid circulating in the loop heat pipe to transport the heat of the heat generator from the evaporator to the condenser and radiate the heat in the condenser, the heat generator is cooled.

It should be noted that in the loop heat pipe described in Document 1, the evaporator has a wick of a flat plate type, a groove member disposed below the wick to form a vapor channel, and a housing for housing the wick and the groove member, and the heat generator is connected to the housing.

The wick is formed of a porous material, and the working fluid in the liquid phase soaks into the wick from a liquid reservoir in the housing due to a capillary action. The working fluid having soaked into the wick evaporates due to the heat transferred from the heat generator to change to the working fluid in the vapor phase, and the working fluid in the vapor phase flows through the vapor channel in the groove member, and then flows into the vapor pipe.

In the loop heat pipe, in order to improve the cooling efficiency of the cooling target, the evaporation performance of the working fluid in the liquid phase is required to be high in the evaporator.

To deal with such a requirement, it is conceivable to form the wick with metal high in heat transfer rate to evaporate the working fluid in the liquid phase in the wick with the heat transferred from the groove member. However, in such a configuration, a phenomenon called heat leak that the heat having been transferred to the wick is transferred to the working fluid in the liquid phase located inside the reservoir becomes apt to occur. When the heat leak occurs, the temperature of the working fluid in the liquid phase rises to raise the pressure in the evaporator, and thus, the phase change of the working fluid from the liquid phase to the vapor phase becomes difficult to occur to decrease the cooling efficiency of the cooling target.

To deal with the occurrence of such heat leak, it is conceivable to increase the thickness of the wick to thereby suppress the heat transfer toward the reservoir. However, when the thickness of the wick increases, the discharge resistance of the working fluid having changed in phase to the vapor phase inside the wick becomes high, and thus, the pressure loss becomes high. Even in this case, the temperature of the working fluid in the liquid phase rises, and thus, the cooling efficiency of the cooling target decreases similarly to the above.

Therefore, there has been demanded the configuration of the evaporator capable of improving the evaporation performance of the working fluid in the liquid phase.

SUMMARY

A cooling device according to a first aspect of the present disclosure includes an evaporator configured to evaporate working fluid in a liquid phase with a heat transferred from a cooling target to change to the working fluid in a vapor phase, a condenser configured to condense the working fluid in the vapor phase to change to the working fluid in the liquid phase, a vapor pipe configured to flow the working fluid changed in phase to the vapor phase in the evaporator into the condenser, and a liquid pipe configured to flow the working fluid changed in phase to the liquid phase in the condenser into the evaporator, wherein the evaporator includes a housing connected to the liquid pipe, the housing into which the working fluid in the liquid phase inflows, the housing having a reservoir configured to retain the working fluid in the liquid phase flowed into the housing, a wick disposed in the housing, the wick soaked with the working fluid in the liquid phase to retain the working fluid in the liquid phase, and a groove member having a plurality of flow channels through which the working fluid changed in phase from the liquid phase to the vapor phase flows, the groove member connected to the wick, the wick has a first layer, a second layer and a third layer disposed between the groove member and the reservoir in this order from the groove member toward the reservoir, the first layer has a plurality of first apertures disposed along the plurality of flow channels, and has higher thermal conductivity than both thermal conductivity of the second layer and thermal conductivity of the third layer, the third layer transports the working fluid in the liquid phase retained in the reservoir to the second layer, the second layer has a plurality of second apertures disposed so as to correspond to the plurality of first apertures, the second apertures having aperture area larger than corresponding one of the first apertures, and the second layer transports the working fluid in the liquid phase transported from the third layer to the first layer.

In the first aspect described above, the second layer may have elasticity.

In the first aspect described above, a void ratio of the second layer may be lower than a void ratio of the first layer.

In the first aspect described above, the first layer may have the higher thermal conductivity than both the thermal conductivity of the second layer and the thermal conductivity of the third layer by a heat transfer rate of the first layer being higher than both a heat transfer rate of the second layer and a heat transfer rate of the third layer.

In the first aspect described above, the first layer may have the higher thermal conductivity than both the thermal conductivity of the second layer and the thermal conductivity of the third layer by a heat transfer rate of the first layer being higher than a heat transfer rate of the second layer, and a thermal resistance of the first layer being lower than a thermal resistance of the third layer.

A cooling device according to a second aspect of the present disclosure includes an evaporator configured to evaporate working fluid in a liquid phase with a heat transferred from a cooling target to change to the working fluid in a vapor phase, a condenser configured to condense the working fluid in the vapor phase to change to the working fluid in the liquid phase, a vapor pipe configured to flow the working fluid changed in phase to the vapor phase in the evaporator into the condenser, and a liquid pipe configured to flow the working fluid changed in phase to the liquid phase in the condenser into the evaporator, wherein the evaporator includes a housing connected to the liquid pipe, the housing into which the working fluid in the liquid phase inflows, the housing having a reservoir configured to retain the working fluid in the liquid phase flowed into the housing, and a vapor generator configured to evaporate the working fluid in the liquid phase supplied from the reservoir, the vapor generator has a flow channel forming layer, a connecting layer and a liquid transport layer disposed in this order toward the reservoir, the flow channel forming layer has a plurality of flow channels through which the working fluid changed in phase from the liquid phase to the vapor phase flows, the flow channels communicated with the vapor pipe, the connecting layer has a plurality of first apertures disposed along the plurality of flow channels, the connecting layer having higher thermal conductivity than both thermal conductivity of the intermediate layer and thermal conductivity of the liquid transport layer, the connecting layer connected to the flow channel forming layer, the liquid transport layer transports the working fluid in the liquid phase retained in the reservoir to the intermediate layer, the intermediate layer has a plurality of second apertures disposed so as to correspond to the plurality of first apertures, the second apertures having aperture area larger than corresponding one of the first apertures, and the intermediate layer transports the working fluid in the liquid phase transported from the liquid transport layer to the connecting layer.

In the first and second aspects described above, the condenser may include a vapor flow channel through which the working fluid in the vapor phase flows from the vapor pipe, a plurality of fine flow channels connected to the vapor flow channel, the fine flow channels smaller in flow channel cross-sectional area than the vapor flow channel, and a liquid flow channel connected to the plurality of fine flow channels to guide, to the liquid pipe, the working fluid changed in phase to the liquid phase inflowing from the plurality of fine flow channels.

In the first and second aspects described above, the liquid flow channel may include a first extending part connected to the plurality of fine flow channels, the first extending part through which the working fluid in the liquid phase flows in an opposite direction to a flow direction of the working fluid in the vapor phase in the vapor flow channel, a folding-back part disposed in an end part on a downstream in a flow direction of the working fluid in the first extending part, the folding-back part configured to reverse the flow direction of the working fluid in the liquid phase, and a second extending part connected to the folding-back part, the second extending part through which the working fluid in the liquid phase flowed through the first extending part flows via the folding-back part.

A projector according to a third aspect of the present disclosure includes a light source configured to emit light, a light modulator configured to modulate the light emitted from the light source, a projection optical device configured to project the light modulated by the light modulator, and anyone of the cooling devices described above.

In the third aspect described above, the cooling target may be the light source.

DESCRIPTION OF EXEMPLARY EMBODIMENT

Figure 1:
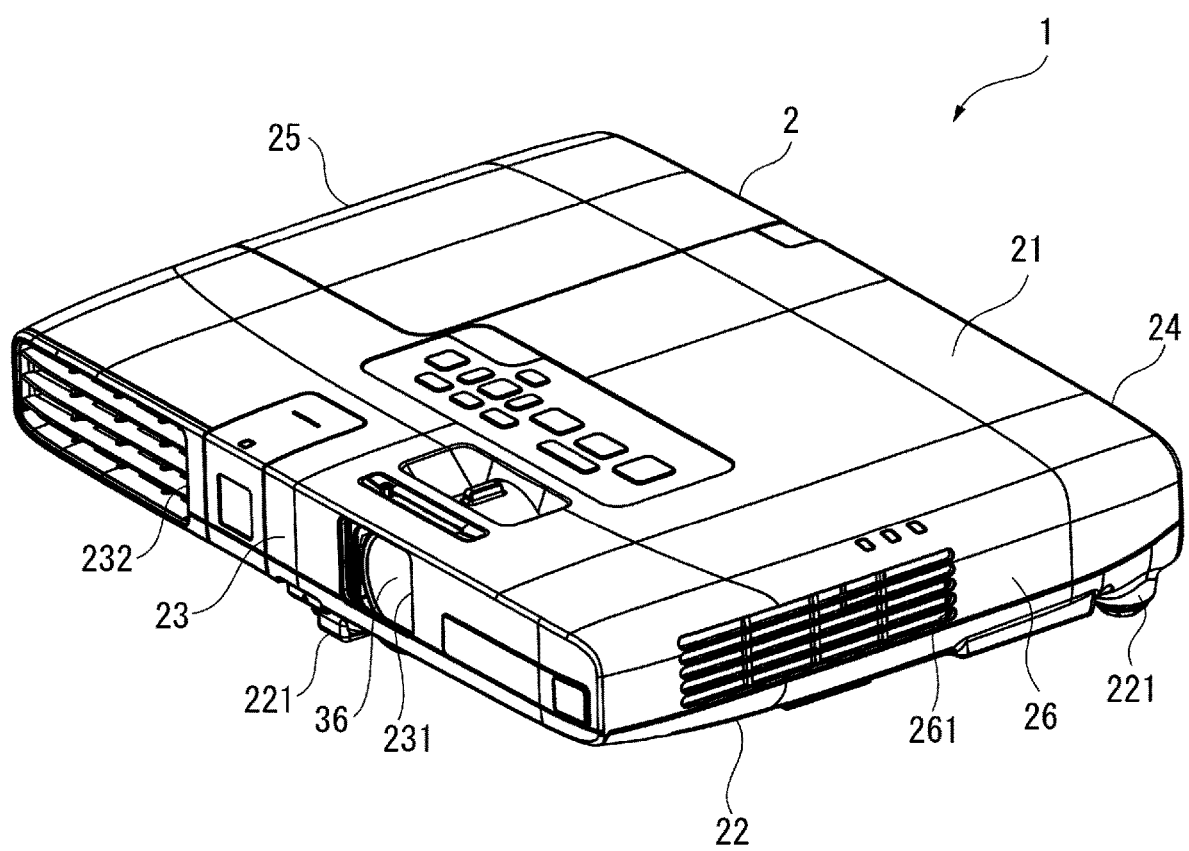
FIG. 1 is a perspective view showing the appearance of a projector according to an embodiment of the present disclosure.

An embodiment of the present disclosure will hereinafter be described based on the accompanying drawings.
Configuration of Projector FIG. 1 is a perspective view showing the appearance of the projector 1 according to the present embodiment.

The projector 1 according to the present embodiment is an image display device for modulating the light emitted from a light source device 4 described later to form an image corresponding to image information, and then projecting the image thus formed on a projection target surface such as a screen in an enlarged manner. As shown in FIG. 1, the projector 1 is provided with an exterior housing 2 constituting the exterior of the projector 1.
Configuration of Exterior Housing The exterior housing 2 has a top surface part 21, a bottom surface part 22, a front surface part 23, a back surface part 24, a left side surface part 25 and a right side surface part 26, and is formed to have a substantially rectangular solid shape.

The bottom surface part 22 has a plurality of leg parts 221 having contact with an installation surface on which the projector 1 is mounted.

The front surface part 23 is located on the projection side of an image in the exterior housing 2. The front surface part 23 has an opening part 231 for exposing a part of a projection optical device 36 described later, and the image to be projected by the projection optical device 36 passes through the opening part 231. Further, the front surface part 23 has an exhaust port 232 from which a cooling gas having cooled the cooling target in the projector 1 is discharged to the outside of the exterior housing 2.

The right side surface part 26 has an introduction port 261 from which a gas such as air located outside the exterior housing 2 is introduced inside as the cooling gas.

Internal Configuration of Projector

Figure 2:
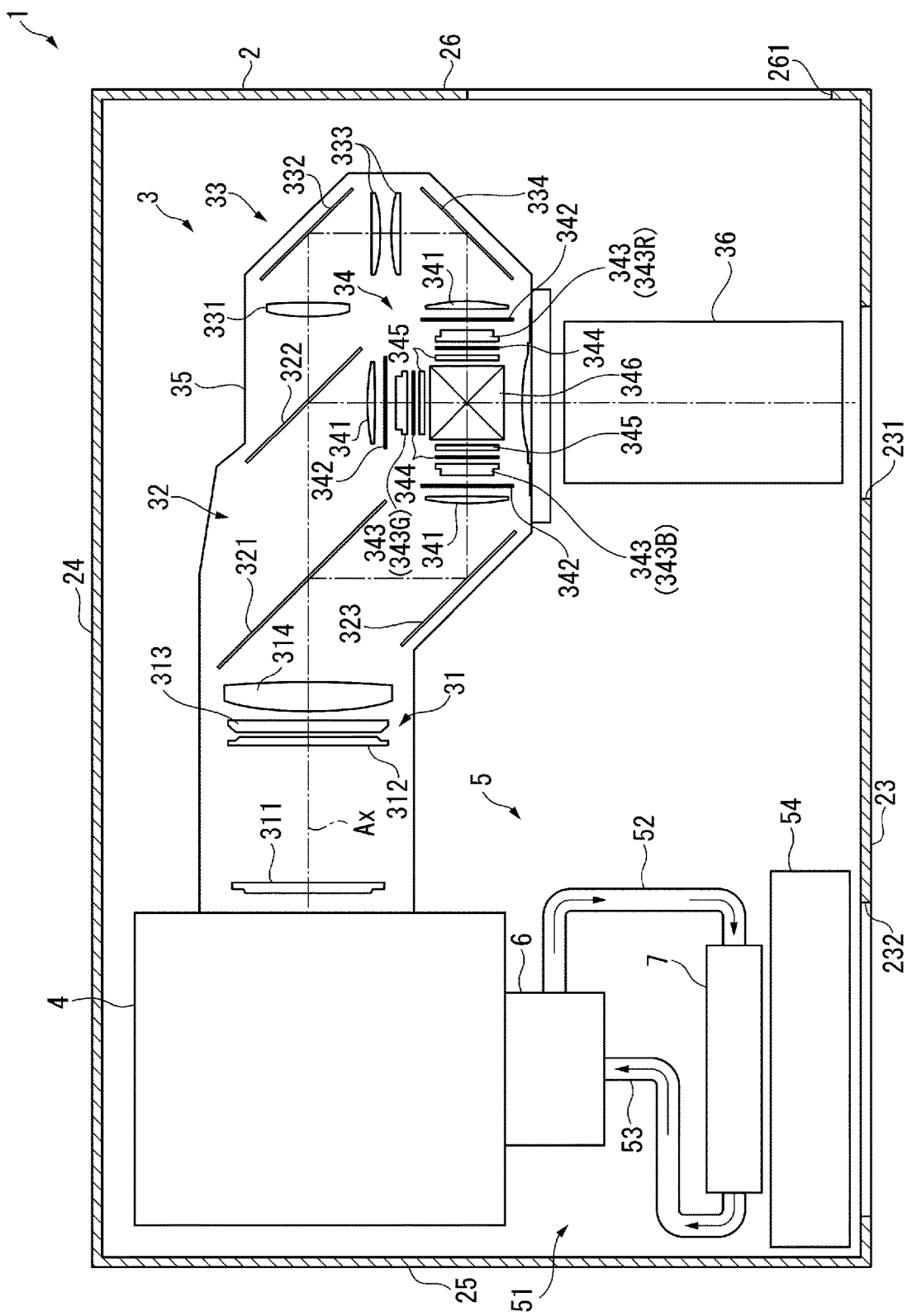
FIG. 2 is a schematic diagram showing an internal configuration of the projector according to the embodiment.

FIG. 2 is a schematic diagram showing an internal configuration of the projector 1.

As shown in FIG. 2, the projector 1 is further provided with an image projection device 3 and a cooling device 5 each housed inside the exterior housing 2. Besides the above, although not shown in the drawing, the projector 1 is provided with a control device for controlling an operation of the projector 1, and a power supply device for supplying electronic components of the projector 1 with electrical power.

Configuration of Image Projection Device

The image projection device 3 forms and then projects the image corresponding to the image information input from the control device. The image projection device 3 is provided with a light source device 4, a homogenizing device 31, a color separation device 32, a relay device 33, an image forming device 34, an optical component housing 35 and a projection optical device 36.

The light source device 4 emits illumination light. A configuration of the light source device 4 will be described later in detail.

The homogenizing device 31 homogenizes the illumination light emitted from the light source device 4. The illumination light thus homogenized illuminates modulation areas of light modulation devices 343 described later of the image forming device 34 via the color separation device 32 and the relay device 33. The homogenizing device 31 is provided with two lens arrays 311, 312, a polarization conversion element 313 and a superimposing lens 314.

The color separation device 32 separates the light having entered the color separation device 32 from the homogenizing device 31 into colored light beams of red, green and blue. The color separation device 32 is provided with two dichroic mirrors 321, 322, and a reflecting mirror 323 for reflecting the blue light beam having been separated by the dichroic mirror 321.

The relay device 33 is disposed on a light path of the red light beam longer than light paths of other colored light beams to suppress a loss of the red light beam. The relay device 33 is provided with an incident side lens 331, relay lenses 333 and reflecting mirrors 332, 334. It should be noted that in the present embodiment, the relay device 33 is disposed on the light path of the red light beam. However, this is not a limitation, and it is also possible to adopt a configuration in which, for example, the colored light beam longer in light path than other colored light beams is the blue light beam, and the relay device 33 is disposed on the light path of the blue light beam.

The image forming device 34 modulates each of the colored light beams of red, green and blue having entered the image forming device 34, and combines the colored light beams thus modulated with each other to form the image. The image forming device 34 is provided with three field lenses 341, three incident side polarization plates 342, three light modulation devices 343, three view angle compensation plates 344 and three exit side polarization plates 345 each disposed in accordance with the respective colored light beams entering the image forming device 34, and a single color combining device 346.

The light modulation devices 343 each modulate the light emitted from the light source device 4 in accordance with the image information. The light modulation devices 343 include the light modulation device 343R for the red light beam, the light modulation device 343G for the green light beam, and the light modulation device 343B for the blue light beam. In the present embodiment, the light modulation devices 343 are each formed of a transmissive liquid crystal panel, and the incident side polarization plate 342, the light modulation device 343 and the exit side polarization plate 345 constitute a liquid crystal light valve.

The color combining device 346 combines the colored light beams respectively modulated by the light modulation devices 343B, 343G and 343R with each other to form the image. In the present embodiment, the color combining device 346 is formed of a cross dichroic prism, but this is not a limitation, and it is also possible for the color combining device 346 to be formed of a plurality of dichroic mirrors.

The optical component housing 35 houses the devices 31 through 34 described above inside. It should be noted that an illumination light axis Ax as a design optical axis is set to the image projection device 3, and the optical component housing 35 holds the devices 31 through 34 at predetermined positions on the illumination light axis Ax. It should be noted that the light source device 4 and the projection optical device 36 are disposed at predetermined positions on the illumination light axis Ax.

The projection optical device 36 projects the image, which enters the projection optical device 36 from the image forming device 34, on the projection target surface in an enlarged manner. In other words, the projection optical device 36 projects the light beams, which have respectively been modulated by the light modulation devices 343B, 343G and 343R. The projection optical device 36 is configured as a combination lens composed of a plurality of lenses housed in a lens tube having a cylindrical shape, for example.

Configuration of Light Source Device

Figure 3:
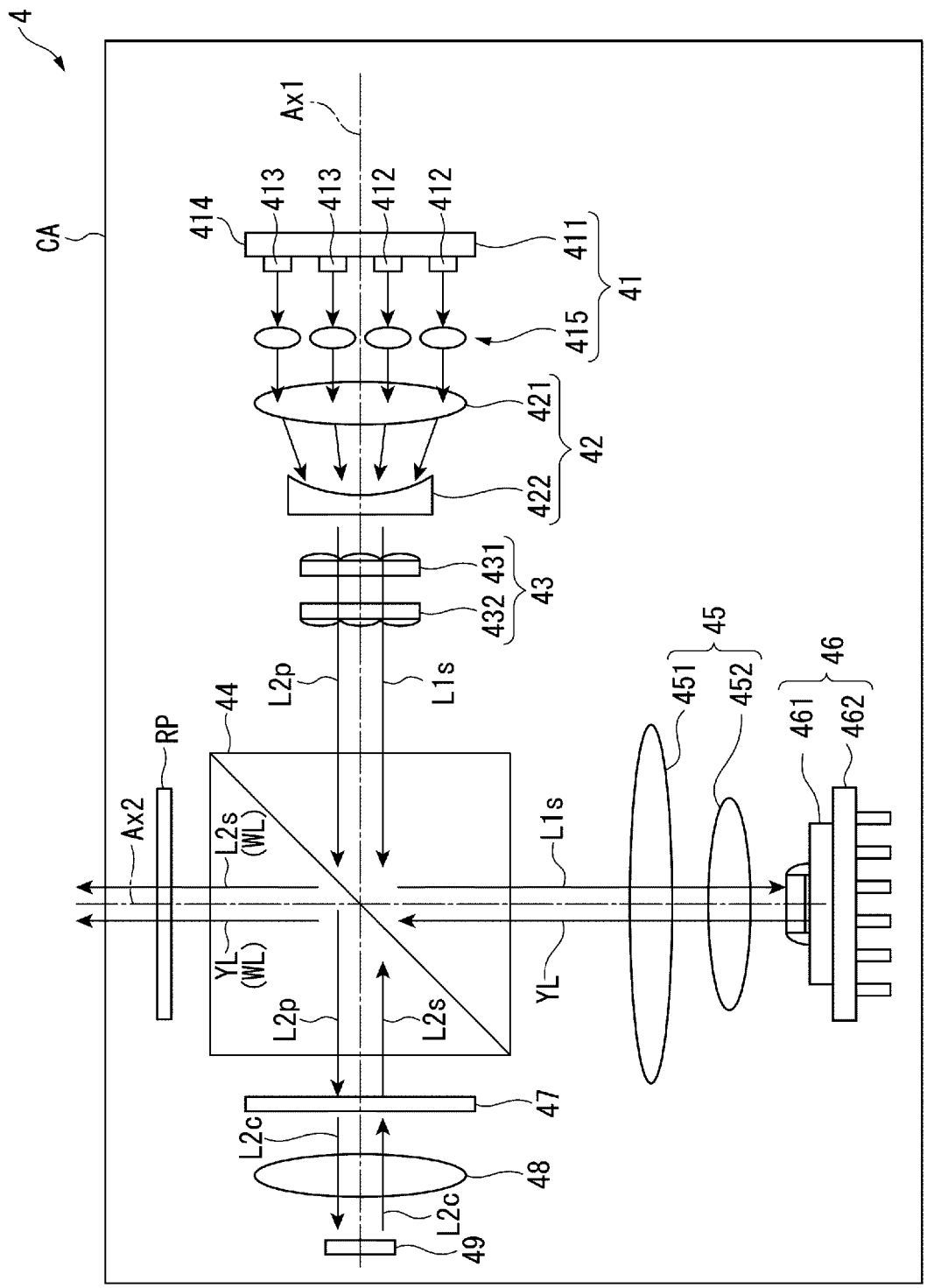
FIG. 3 is a schematic diagram showing a configuration of a light source device in the embodiment.

FIG. 3 is a schematic diagram showing a configuration of the light source device 4.

The light source device 4 emits the illumination light to the homogenizing device 31. As shown in FIG. 3, the light source device 4 is provided with a light source housing CA, and a light source unit 41, an afocal optical element 42, a homogenizer optical element 43, a polarization split element 44, a first light collection element 45, a wavelength conversion element 46, a first retardation element 47, a second light collection element 48, a diffusely reflecting device 49 and a second retardation element RP each housed inside the light source housing CA.

The light source housing CA is configured as a sealed housing difficult for dust or the like to enter the inside thereof.

The light source unit 41, the afocal optical element 42, the homogenizer optical element 43, the polarization split element 44, the first retardation element 47, the second light collection element 48 and the diffusely reflecting device 49 are arranged on an illumination light axis Ax1 set in the light source device 4.

The wavelength conversion element 46, the first light collection element 45, the polarization split element 44 and the second retardation element RP are set in the light source device 4, and are arranged on an illumination light axis Ax2 perpendicular to the illumination light axis Ax1.

Configuration of Light Source Unit

The light source unit 41 is provided with a light source 411 for emitting the light, and collimator lenses 415.

The light source 411 is provided with a plurality of first semiconductor lasers 412 and a plurality of second semiconductor lasers 413, and a support member 414.

The first semiconductor lasers 412 each emit blue light L1s, which is s-polarized light, as excitation light. The blue light L1s is, for example, a laser beam with a peak wavelength of 440 nm. The blue light L1s having been emitted from the first semiconductor lasers 412 enters the wavelength conversion element 46.

The second semiconductor lasers 413 each emit blue light L2p, which is p-polarized light. The blue light L2p is, for example, a laser beam with a peak wavelength of 460 nm. The blue light L2p having been emitted from the second semiconductor lasers 413 enters the diffusely reflecting device 49.

The support member 414 supports the plurality of first semiconductor lasers 412 and the plurality of second semiconductor lasers 413 each arranged in an array in a plane perpendicular to the illumination light axis Ax1. The support member 414 is a member made of metal having thermal conductivity, and is connected to an evaporator 6 described later. Thus, the heat of each of the semiconductor lasers 412, 413 as a heat source, namely the heat of the light source 411, is transferred to the evaporator 6.

The blue light L1s having been emitted from the first semiconductor lasers 412 and the blue light L2p having been emitted from the second semiconductor lasers 413 are converted by the collimator lenses 415 into parallel light beams, and then enter the afocal optical element 42.

It should be noted that in the present embodiment, the light source 411 has a configuration of emitting the blue light L1s as the s-polarized light and the blue light L2p as the p-polarized light. However, this is not a limitation, and the light source 411 can also be provided with a configuration of emitting a blue light beam, which is a linearly polarized light beam the same in polarization direction. In this case, it is sufficient to dispose a retardation element, which changes one type of linearly polarized light having entered the retardation element to light including s-polarized light and p-polarized light, between the light source unit 41 and the polarization split element 44.

Configuration of Afocal Optical Element and Homogenizer Optical Element

The afocal optical element 42 adjusts the beam diameter of the blue light L1s, L2p which enters the afocal optical element 42 from the light source unit 41, and then makes the blue light L1s, L2p enter the homogenizer optical element 43. The afocal optical element 42 is constituted by a lens 421 for collecting the incident light, and a lens 422 for collimating the light beam collected by the lens 421.

The homogenizer optical element 43 homogenizes the illuminance distribution of the blue light L1s, L2p. The homogenizer optical element 43 is formed of a pair of multi-lens arrays 431, 432.

Configuration of Polarization Split Element

The blue light L1s, L2p having been transmitted through the homogenizer optical element 43 enters the polarization split element 44.

The polarization split element 44 is a prism-type polarization beam splitter, and separates an s-polarization component and a p-polarization component included in the incident light from each other. Specifically, the polarization split element 44 reflects the s-polarization component, and transmits the p-polarization component. Further, the polarization split element 44 has a color separation characteristic of transmitting light with the wavelength no shorter than a predetermined wavelength irrespective of whether the light is the s-polarization component or the p-polarization component. Therefore, the blue light L1s as the s-polarized light is reflected by the polarization split element 44, and then enters the first light collection element 45. Meanwhile, the blue light L2p as the p-polarized light is transmitted through the polarization split element 44, and then enters the first retardation element 47.

Configuration of First Light Collection Element

The first light collection element 45 converges the blue light L1s having been reflected by the polarization split element 44 on the wavelength conversion element 46. Further, the first light collection element 45 collimates fluorescence YL entering the first light collection element 45 from the wavelength conversion element 46. Although the first light collection element 45 is constituted by two lenses 451, 452 in the example shown in FIG. 3, the number of lenses constituting the first light collection element 45 does not matter.

Configuration of Wavelength Conversion Element

The wavelength conversion element 46 is excited by the incident light to generate the fluorescence YL longer in wavelength than the incident light, and emits the fluorescence YL to the first light collection element 45. In other words, the wavelength conversion element 46 converts the wavelength of the incident light, and emits the light thus converted. The fluorescence YL generated by the wavelength conversion element 46 is, for example, light with the peak wavelength in a range of 500 through 700 nm. The wavelength conversion element 46 is provided with a wavelength converter 461 and a heat radiator 462.

Although not shown in the drawing, the wavelength converter 461 has a wavelength conversion layer and a reflecting layer. The wavelength conversion layer includes a phosphor for diffusely emitting the fluorescence YL as non-polarized light obtained by performing the wavelength conversion on the blue light L1s entering the phosphor. The reflecting layer reflects the fluorescence YL, which enters the reflecting layer from the wavelength conversion layer, toward the first light collection element 45.

The heat radiator 462 is disposed on a surface on an opposite side to the incident side of light in the wavelength converter 461 to radiate the heat generated in the wavelength converter 461.

The fluorescence YL, which has been emitted from the wavelength conversion element 46, passes through the first light collection element 45 along the illumination light axis Ax2, and then enters the polarization split element 44 having the color separation characteristic described above. Then, the fluorescence YL passes through the polarization split element 44 along the illumination light axis Ax2, and then enters the second retardation element RP.

It should be noted that the wavelength conversion element 46 can also be provided with a configuration of being rotated around a rotational axis parallel to the illumination light axis Ax2 by a rotation device such as a motor.

Configuration of First Retardation Element and Second Light Collection Element

The first retardation element 47 is disposed between the polarization split element 44 and the second light collection element 48. The first retardation element 47 converts the blue light L2p having passed through the polarization split element 44 into blue light L2c as circularly polarized light. The blue light L2c enters the second light collection element 48.

The second light collection element 48 converges the blue light L2c, which enters the second light collection element 48 from the first retardation element 47, on the diffusely reflecting device 49. Further, the second light collection element 48 collimates the blue light L2c entering the second light collection element 48 from the diffusely reflecting device 49. It should be noted that the number of lenses constituting the second light collection element 48 can arbitrarily be changed.

Configuration of Diffusely Reflecting Device

The diffusely reflecting device 49 diffusely reflects the blue light L2c, which has entered the diffusely reflecting device 39, at substantially the same diffusion angle as that of the fluorescence YL generated in and emitted from the wavelength conversion element 46. As a configuration of the diffusely reflecting device 49, there can be illustrated a configuration provided with a reflecting plate for performing Lambertian reflection on the blue light L2c having entered the reflecting plate, and a rotation device for rotating the reflecting plate around a rotational axis parallel to the illumination light axis Ax1.

The blue light L2c having diffusely been reflected by the diffusely reflecting device 49 passes through the second light collection element 48, and then enters the first retardation element 47. The blue light L2c is converted into circularly polarized light with the opposite rotational direction when reflected by the diffusely reflecting device 49. Therefore, the blue light L2c having entered the first retardation element 47 via the second light collection element 48 is not converted into the blue light L2p as the p-polarized light at the moment when having entered the first retardation element 47 from the polarization split element 44, but is converted into the blue light L2s as the s-polarized light. Then, the blue light L2s is reflected by the polarization split element 44 to enter the second retardation element RP. Therefore, the light which enters the second retardation element RP from the polarization split element 44 is white light having the blue light L2s and the fluorescence YL mixed with each other.

Configuration of Second Retardation Element

The second retardation element RP converts the white light, which enters the second retardation element RP from the polarization split element 44, into light having s-polarized light and p-polarized light mixed with each other. The illumination light WL as the white light converted in such a manner enters the homogenizing device 31 described above.

Configuration of Cooling Device

The cooling device 5 cools the cooling target constituting the projector 1. In the present embodiment, the cooling target is the light source 411 of the light source device 4. The cooling device 5 includes a loop heat pipe 51 and a cooling fan 54 as shown in FIG. 2.

The cooling fan 54 is disposed between the exhaust port 232 and a condenser 7 described later of the loop heat pipe 51 in the space inside the exterior housing 2. The cooling fan 54 makes cooling air flow through the condenser 7 in the process of suctioning the cooling air inside the exterior housing 2 to discharge the cooling air from the exhaust port 232, and thus, cools the condenser 7. It should be noted that it is also possible to adopt a configuration in which, for example, the cooling fan 54 is disposed between the introduction port 261 and the condenser 7 described later in the space inside the exterior housing 2, suctions the cooling air located outside the exterior housing 2 to feed the cooling air to the condenser 7.

The loop heat pipe 51 has a circulation channel for circulating the working fluid, which is encapsulated in a reduced pressure state to thereby be changed in phase state at a relatively low temperature. In the detailed description, the loop heat pipe 51 causes the phase change of the phase state of the working fluid encapsulated inside in the reduced pressure state from the liquid phase to the vapor phase with the heat transferred from the cooling target to draw the heat from the working fluid in the vapor phase in a region other than regions where the phase change of the working fluid from the liquid phase to the vapor phase has occurred to thereby change the working fluid in phase from the vapor phase to the liquid phase, and at the same time, radiates the heat thus drawn to thereby cool the cooling target. It should be noted that water can be cited as an example of the working fluid.

Such a loop heat pipe 51 is provided with the evaporator 6, a vapor pipe 52, the condenser 7 and a liquid pipe 53. It should be noted that a configuration of the evaporator 6 will be described later in detail.

Configuration of Vapor Pipe and Liquid Pipe

The vapor pipe 52 is a tubular member for connecting the evaporator 6 and the condenser 7 to each other in the circulation channel of the working fluid so that the working fluid in the vapor phase can flow. The vapor pipe 52 makes the working fluid in the vapor phase, which has changed to one in the vapor phase in the evaporator 6 and then flows from the evaporator 6 into the vapor pipe 52, flow into the condenser 7.

The liquid pipe 53 is a tubular member for connecting the condenser 7 and the evaporator 6 to each other in the circulation channel of the working fluid so that the working fluid in the liquid phase can flow. The liquid pipe 53 makes the working fluid, which has changed to one in the liquid phase in the condenser 7, flow into the evaporator 6.

Configuration of Condenser

Figure 4:
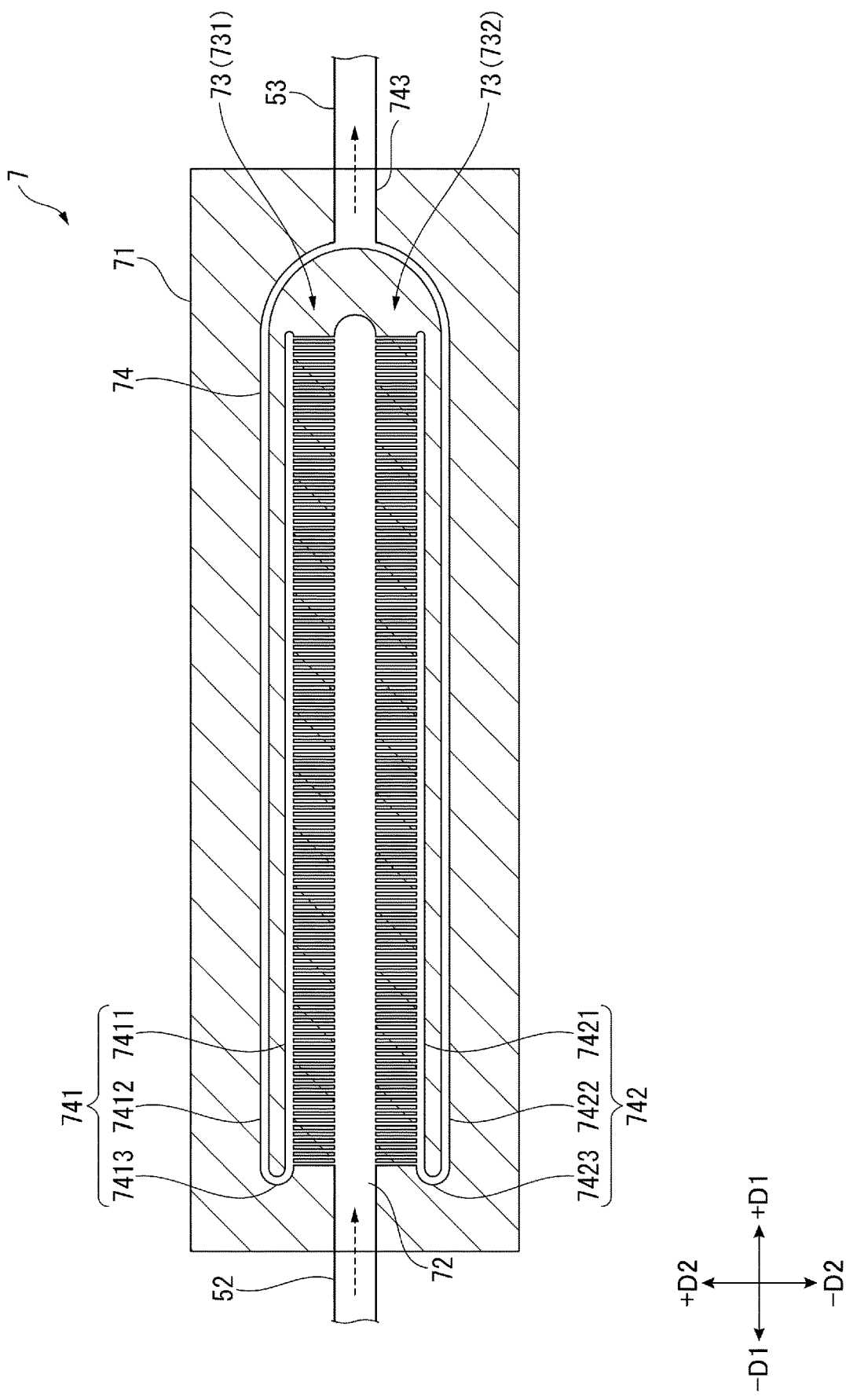
FIG. 4 is a cross-sectional view showing an internal structure of a condenser in the embodiment.

FIG. 4 is a cross-sectional view showing an internal structure of the condenser 7.

The condenser 7 changes the phase of the working fluid from the vapor phase to the liquid phase. In other words, the condenser 7 condenses the working fluid in the vapor phase to change the working fluid in the vapor phase to the working fluid in the liquid phase. As shown in FIG. 4, the condenser 7 has a main body part 71 to which the vapor pipe 52 and the liquid pipe 53 are connected, and a heat radiator not shown connected to the main body part 71. The heat of the working fluid in the vapor phase is received by the main body part 71 and thus the working fluid is cooled in the process in which the working fluid in the vapor phase flows through the flow channel in the main body part 71, and thus, the working fluid in the vapor phase is changed to the working fluid in the liquid phase. Then, the working fluid having been changed in phase to the liquid phase further flows through the flow channel to be cooled by the main body part 71 receiving the heat of the working fluid in the liquid phase, and then flows out to the liquid pipe 53. Hereinafter, the configuration of the condenser 7 will be described in detail.

The heat radiator is a member for radiating the heat of the working fluid having been transferred to the main body part 71, and is a so-called heatsink. Through the heat radiator, the cooling gas in the exterior housing 2 flows due to the drive of the cooling fan 54, and thus, the condenser 7 is cooled.

The main body part 71 draws the heat of the working fluid in the vapor phase inflowing from the evaporator 6 via the vapor pipe 52 to thereby change the working fluid in phase from the vapor phase to the liquid phase, and then makes the working fluid in the liquid phase flow out to the liquid pipe 53. The main body part 71 incorporates a vapor flow channel 72, a plurality of fine flow channels 73 and a liquid flow channel 74 each of which the working fluid can flow through.

The vapor flow channel 72 is a flow channel through which the working fluid in the vapor phase flows from the vapor pipe 52, and extends linearly in the +D1 direction as the inflow direction of the working fluid in the vapor phase from the vapor pipe 52. To the vapor flow channel 72, there is connected the plurality of fine flow channels 73 each extending in a direction perpendicular to the +D1 direction. Therefore, the working fluid in the vapor phase having flowed into the vapor flow channel 72 flows through the fine flow channels 73 in a distributed manner.

The fine flow channels 73 are each a fine flow channel smaller in flow channel cross-section area than the vapor flow channel 72 and the liquid flow channel 74. The plurality of fine flow channels 73 extending in a +D2 direction as a direction perpendicular to the +D1 direction, and in a −D2 direction as an opposite direction to the +D2 direction from the vapor flow channel 72.

Specifically, the plurality of fine flow channels 73 includes a plurality of first fine flow channels 731 and a plurality of second fine flow channels 732. The plurality of first fine channels 731 extends in the +D2 direction from an end part on the +D2 direction side in the vapor flow channel 72, and the plurality of second fine flow channels 732 extends in the −D2 direction from an end part on the −D2 direction side in the vapor flow channel 72. Further, each of the first fine flow channels 731 and each of the second fine flow channels 732 are communicated with the liquid flow channel 74. In other words, the plurality of fine flow channels 73 connects the vapor flow channel 72 and the liquid flow channel 74 to each other so that the working fluid can flow therethrough.

The heat of the working fluid in the vapor phase as the vapor having flowed into the vapor flow channel 72 is transferred to the main body part 71 in the process in which the working fluid in the vapor phase flows through the plurality of first fine flow channel 731 or the plurality of second fine flow channels 732, and thus, the working fluid in the vapor phase changes to the working fluid in the liquid phase. The working fluid having changed in phase to the liquid phase flows into the liquid flow channel 74 due to a capillary force of each of the fine flow channels 73.

The liquid flow channel 74 is a flow channel for connecting the plurality of fine flow channels 73 and the liquid pipe 53 to each other so that the working fluid in the liquid phase can flow therethrough, and at the same time, drawing the heat from the working fluid in the liquid phase flowing inside. In other words, the liquid flow channel 74 is connected to the plurality of fine flow channels 73 to guide the working fluid in the liquid phase, which inflows from the plurality of fine flow channels 73, to the liquid pipe 53. The liquid flow channel 74 has a first flow channel 741 connected to the plurality of first fine flow channels 731, a second flow channel 742 connected to the plurality of second flow channels 732, and a junction channel 743 where the working fluid in the liquid phase having flowed through the first flow channel 741 and the working fluid in the liquid phase having flowed through the second flow channel 742 join each other. The junction channel 743 connects the liquid pipe 53, and the first flow channel 741 and the second flow channel 742 to each other.

The first flow channel 741 and the second flow channel 742 are each formed to have a substantially U shape. In the detailed description, the first flow channel 741 has a first extending part 7411, a second extending part 7412 and a folding-back part 7413.

The first extending part 7411 extends in parallel to the +D1 direction, and is connected to each of the first flow channels 731. Further, the working fluid which has flowed through the plurality of first fine flow channels 731 to thereby be changed in phase to the liquid phase flows through the first extending part 7411 in the −D1 direction as the opposite direction to the +D1 direction as the flow direction of the working fluid in the vapor phase in the vapor flow channel 72.

The second extending part 7412 extends substantially in parallel to the first extending part 7411, and is configured so that the working fluid in the liquid phase can flow inside. The second extending part 7412 is connected to the folding-back part 7413 described later, and the working fluid in the liquid phase having flowed through the first extending part 7411 flows inside via the folding-back part 7413.

The folding-back part 7413 is disposed in the end part on the −D1 direction side as a downstream in the flow direction of the working fluid in the first extending part 7411, and is connected to an end part on the −D1 direction side as an upstream in the flow direction of the working fluid in the second extending part 7412. The folding-back part 7413 makes the working fluid inflowing from the first extending part 7411 flow into the second extending part 7412. By flowing through the folding-back part 7413, the flow direction of the working fluid in the liquid phase flowing through the second extending part 7412 is reversed with respect to the flow direction of the working fluid in the liquid phase in the first extending part 7411. In other words, the folding-back part 7413 reverses the flow direction of the working fluid in the liquid phase. It should be noted that the end part in the +D1 direction in the second extending part 7412 is connected to the junction channel 743.

Similarly to the first flow channel 741, the second flow channel 742 also has a first extending part 7421 extending in the +D1 direction, a second extending part 7422 extending substantially in parallel to the first extending part 7421, and a folding-back part 7423 for connecting end parts in the −D1 direction in the first extending part 7421 and the second extending part 7422 to each other.

The junction channel 743 is a region for connecting the second extending parts 7412, 7422 and the liquid pipe 53 to each other, and is formed to have a substantially Y shape.

It should be noted that in the present embodiment, the inside diameter of the first flow channel 741 and the inside diameter of the second flow channel 742 are smaller than the inside diameter of the vapor flow channel 72. In other words, the area of a cross-sectional surface perpendicular to the direction in which the first flow channel 741 extends, and the area of a cross-sectional surface perpendicular to the direction in which the second flow channel 742 extends are smaller than the area of the cross-sectional surface perpendicular to the direction in which the vapor flow channel 72 extends. This is arranged in consideration of suppression of the occurrence of the pressure loss due to a decrease in volume of the working fluid since the volume of the working fluid in the liquid phase flowing through the liquid flow channel 74 is smaller than the volume of the working fluid in the vapor phase flowing through the vapor flow channel 72.

In such a condenser 7, a part of the working fluid in the vapor phase having flowed into the vapor flow channel 72 from the vapor pipe 52 flows into the plurality of first fine flow channels 731, and another part thereof flows into the plurality of second fine flow channels 732.

The working fluid which has flowed through the plurality of first fine flow channels 731 to thereby be change in phase to the liquid phase inflows into the first extending part 7411 of the first flow channel 741 from the first fine flow channels 731.

The working fluid in the vapor phase having flowed into the plurality of second fine flow channels 732 is also changed to the working fluid in the liquid phase in a similar manner, and then inflows into the first extending part 7421 of the second flow channel 742 from the second fine flow channels 732.

The working fluid in the liquid phase having flowed into the first extending parts 7411, 7421 flows in the −D1 direction, and then flows through the second extending parts 7412, 7422 in the +D1 direction via the folding-back parts 7413, 7423, respectively. By the working fluid in the liquid phase flowing through the first flow channel 741 and the second flow channel 742 as described above, the heat of the working fluid in the liquid phase is transferred to the main body part 71, and thus, the working fluid in the liquid phase is further cooled. It should be noted that since the first flow channel 741 and the second flow channel 742 through which the working fluid in the liquid phase flows each have the substantially U shape, it becomes possible to elongate the flow channel of the working fluid in the liquid phase in the condenser 7, and thus, it is possible to efficiently transfer the heat from the working fluid in the liquid phase to the main body part 71.

The working fluid in the liquid phase having flowed through the second extending part 7412 and the working fluid in the liquid phase having flowed through the second extending part 7422 join each other in the junction channel 743, and then inflow into the liquid pipe 53.

As described above, the working fluid in the liquid phase having been generated by condensing the working fluid in the vapor phase in the condenser 7 flows into the liquid pipe 53, and by extension, flows into the evaporator 6.

Hereinabove, the basic structure of the condenser 7 in the present embodiment is described. Such a condenser 7 can further be provided with the following features.

For example, it is also possible for the fine flow channels 73 to be arranged densely in a region on the −D1 direction side as the upstream in the vapor flow channel 72, and arranged sparsely in a region on the +D1 direction side as the downstream. In other words, the plurality of fine flow channels 73 can be disposed so that the number per unit area of the fine flow channels 73 to be connected to the region on the upstream in the vapor flow channel 72 becomes larger than the number per unit area of the fine flow channels to be connected to the region on the downstream. In this case, it is also possible to make the inside diameter or the cross-sectional area of the fine flow channels 73 to be connected to the region on the upstream of the vapor flow channel 72 smaller, and make the inside diameter or the cross-sectional area of the fine flow channels 73 to be connected to the region on the downstream larger. When the fine flow channels 73 are disposed in such a manner, since it is possible to make the working fluid in the vapor phase which has flowed into the region on the upstream of the vapor flow channel 72 and is high in temperature flow into the plurality of fine flow channels arranged densely, it is possible to facilitate the heat reception from the working fluid in the vapor phase, and thus, it is possible to efficiently perform the phase change of the working fluid from the vapor phase to the liquid phase.

Further, it is also possible to, for example, thicken the region on the upstream in the vapor flow channel 72, and thin the region in the downstream. In other words, the vapor flow channel 72 can also be configured so that the inside diameter or the cross-sectional area decreases in the direction toward the downstream. In this case, the inside diameter or the cross-sectional area of the vapor flow channel 72 can also continuously decrease in the direction toward the downstream, or can also decrease in a stepwise manner. It should be noted that taking the occurrence of the pressure loss in the vapor flow channel 72 into consideration, it is more preferable for the inside diameter of the vapor flow channel 72 to decrease continuously than to decrease in a stepwise manner.

Similarly, it is also possible to adopt a fine flow channel decreasing in the inside diameter or the cross-sectional area in the direction toward the downstream as at least one of the fine flow channels 73. For example, it is also possible to adopt a first fine flow channel decreasing in the inside diameter or the cross-sectional area in the direction toward the +D1 direction as at least one of the first fine flow channels 731. Also in this case, the inside diameter or the cross-sectional area of the fine flow channels 73 can also continuously decrease in the direction toward the downstream, or can also decrease in a stepwise manner.

Further, for example, the shape of the cross-sectional surface perpendicular to the direction in which the vapor flow channel 72 extends, the shape of the cross-sectional surface perpendicular to the direction in which the fine flow channels 73 extend, and the shape of the cross-sectional surface perpendicular to the direction in which the liquid flow channel 74 extends are not limited to the circular shape, but can also be an elliptical shape or a polygonal shape. It should be noted that when a corner part exists in the cross-sectional shape, the pressure loss becomes apt to occur in the corner part. Therefore, it is preferable for the cross-sectional shape of the member through which the working fluid flows to have a circular shape or an elliptical shape.

It should be noted that it is assumed that the condenser 7 is provided with the plurality of first fine flow channels 731 connected to the vapor flow channel 72, the first flow channel 741 connected to the plurality of first fine flow channels 731, the plurality of second fine flow channels 732 similarly connected to the vapor flow channel 72, and the second flow channel 742 connected to the plurality of second fine flow channels 732. However, this is not a limitation, and either one of the set of the first fine flow channels 731 and the first flow channel 741, and the set of the second fine flow channels 732 and the second flow channel 742 can be eliminated.

Configuration of Evaporator

Figure 5:
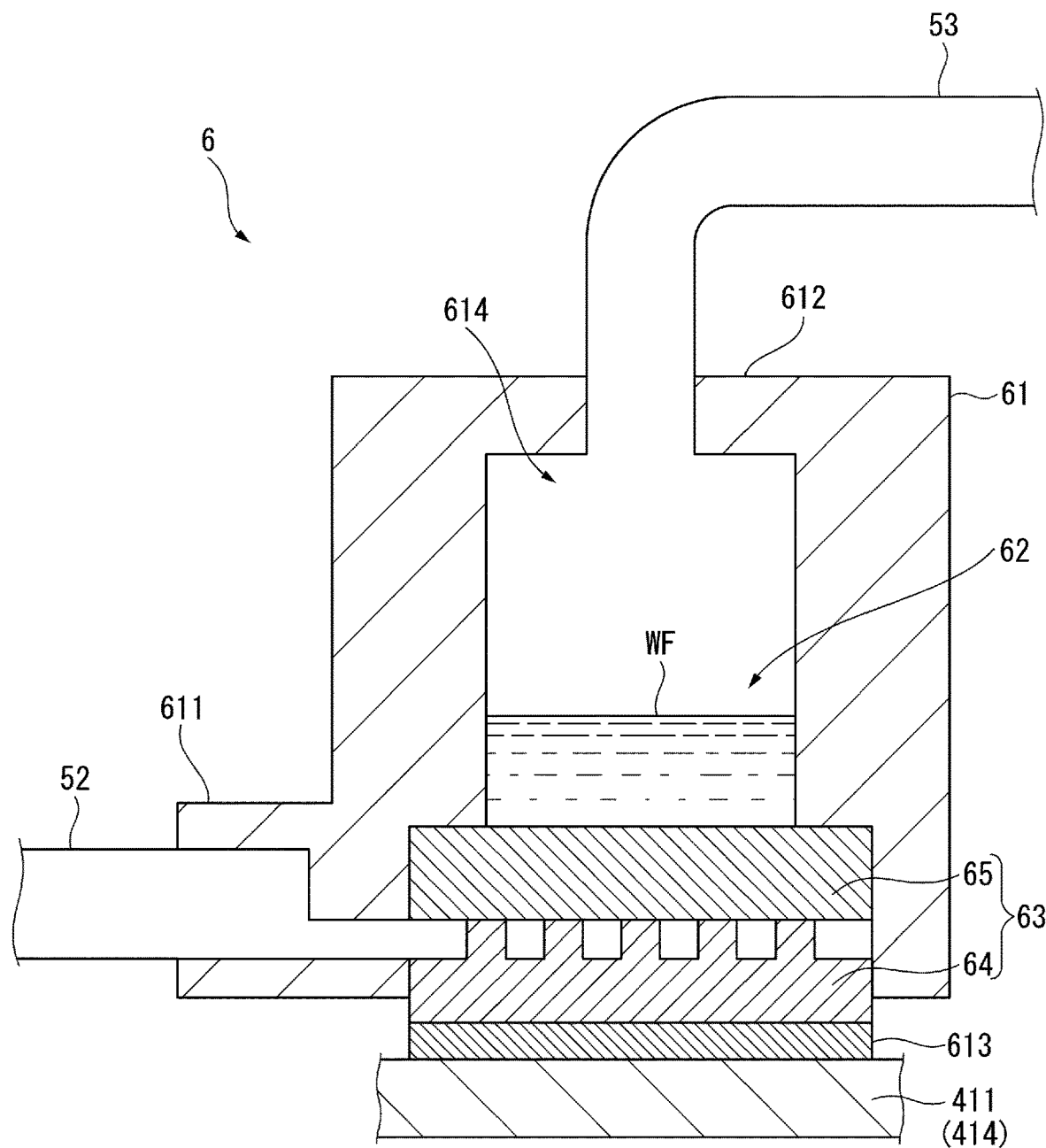
FIG. 5 is a cross-sectional view showing an internal structure of an evaporator in the embodiment.

FIG. 5 is a cross-sectional view showing an internal structure of the evaporator 6.

As shown in FIG. 2, the evaporator 6 is an evaporator which is connected to the light source 411 as the cooling target, and evaporates the working fluid in the liquid phase with the heat transferred from the light source 411 to change the working fluid in the liquid phase to the working fluid in the vapor phase. Specifically, the evaporator 6 is connected to the support member 414 of the light source 411, and evaporates the working fluid in the liquid phase with the heat of the semiconductor lasers 412, 413 transferred via the support member 414 to thereby cool the semiconductor lasers 412, 413.

As shown in FIG. 5, the evaporator 6 is provided with a housing 61, a reservoir 62 and a vapor generator 63.

Configuration of Housing and Reservoir

The housing 61 is a housing made of metal, and has a vapor pipe coupler 611, a liquid pipe coupler 612, and a heat receiving member 613, wherein the vapor pipe 52 is connected to the vapor pipe coupler 611, the liquid pipe coupler 612 is located on an opposite side to the vapor pipe coupler 611, the liquid pipe 53 is connected to the liquid pipe coupler 612, and the heat receiving member 613 is connected to the support member 414 of the light source 411 as the cooling target of the loop heat pipe 51, and transfers the heat generated in the semiconductor lasers 412, 413 to a groove member 64 described later of the vapor generator 63.

Besides the above, the housing 61 has a space 614 inside, wherein the space 614 is communicated with the vapor pipe 52 via the vapor pipe coupler 611, and is communicated with the liquid pipe 53 via the liquid pipe coupler 612. In other words, to the housing 61, there is connected the liquid pipe 53, and the working fluid in the liquid phase inflows into the space 614 inside the housing 61 from the liquid pipe 53.

The reservoir 62 is a reservoir disposed in the space 614 located inside the housing 61 to retain the working fluid WF in the liquid phase having flowed into the space 614 via the liquid pipe 53. In other words, the reservoir 62 is a region in which the working fluid WF in the liquid phase having failed to be suctioned by the wick 65 is retained in the space 614.

Configuration of Vapor Generator

Figure 6:
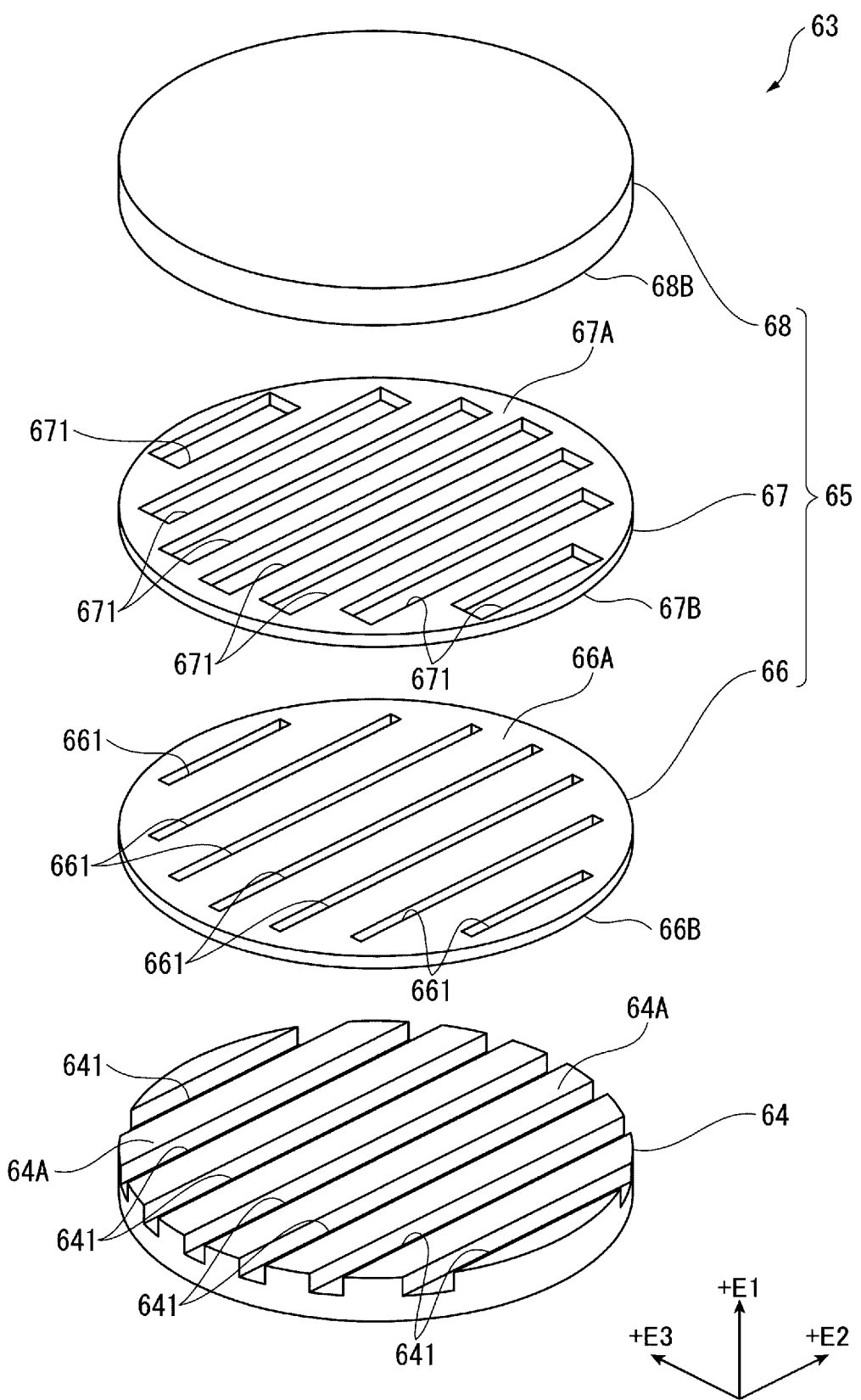
FIG. 6 is an exploded perspective view showing a vapor generator in the embodiment.
Figure 7:
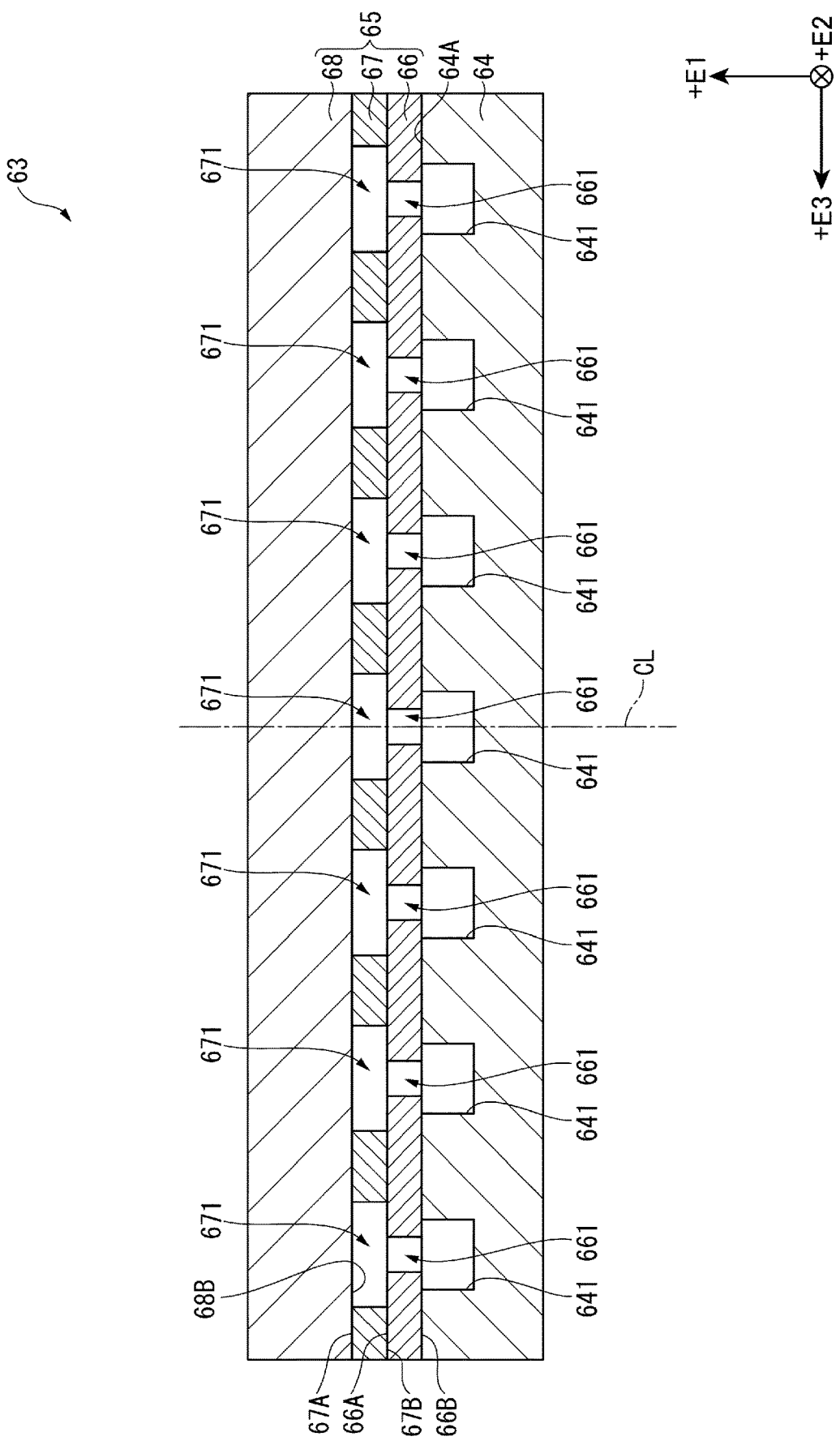
FIG. 7 is a cross-sectional view showing the vapor generator in the embodiment.

FIG. 6 is an exploded perspective view showing the vapor generator 63, and FIG. 7 is a cross-sectional view showing the vapor generator 63.

The vapor generator 63 is a region disposed in the space 614 located inside the housing 61 to change the working fluid WF in the liquid phase supplied from the reservoir 62 to the working fluid in the vapor phase with the heat transferred from the cooling target. In other words, the vapor generator 63 is a region for changing the phase of the working fluid from the liquid phase to the vapor phase with the heat of the cooling target to thereby generate the vapor as the working fluid in the vapor phase. As shown in FIG. 5 through FIG. 7, the vapor generator 63 has the groove member 64 and the wick 65.

It should be noted that in the following description, a direction from the groove member 64 toward the wick 65 is defined as +E1 direction. Further, two directions perpendicular to the +E1 direction, and perpendicular to each other are defined as a +E2 direction and a +E3 direction. Further, although not shown in the drawings, opposite directions to the +E1 direction and the +E2 directions are defined as a −E1 direction and a −E2 direction, respectively.

Configuration of Groove Member

The groove member 64 is formed of metal having thermal conductivity. The groove member 64 is disposed in the space 614 located inside the housing 61, and is connected to the wick 65. The groove member 64 is disposed at a position on an opposite side to the reservoir 62 across the wick 65 in the space 614 located inside the housing 61. The groove member 64 evaporates the working fluid in the liquid phase having been transported by the wick 65 with the heat transferred from the cooling target via the heat receiving member 613, namely the heat transferred from the light source 411 via the support member 414 and the heat receiving member 613. The groove member 64 has a plurality of flow channels 641 through which the working fluid in the vapor phase having been changed from one in the liquid phase flows.

The flow channels 641 are each a recessed part communicated with the vapor pipe 52, and the recessed part is recessed from an end surface 64A on the +E1 direction side in the groove member 64 toward the −E direction, and extends in the +E2 direction.

Further, the working fluid in the vapor phase having been changed from one in the liquid phase in the vapor generator 63 flows out to the vapor pipe 52 through the plurality of flow channels 641. As described above, the groove member 64 is a flow channel forming layer provided with the plurality of flow channels 641 is formed in the vapor generator 63.

It should be noted that when an amount of the heat transferred from the cooling target is small, the groove member 64 changes the working fluid in the liquid phase having been transported from the wick 65 to the end surface 64A to the working fluid in the vapor phase with the head transferred from the cooling target in some cases.

Configuration of Wick

The wick 65 is a porous body which is disposed together with the groove member 64 in the space 614 located inside the housing 61, and is shaped like a flat plate as a whole. The wick 65 is soaked with the working fluid in the liquid phase supplied from the reservoir 62 to retain the working fluid in the liquid phase. The wick 65 suctions the working fluid WF in the liquid phase retained in the reservoir 62 with a capillary force to transport the working fluid WF in the liquid phase toward the groove member 64. The wick 65 has a three-layer structure having a first layer 66, a second layer 67 and a third layer 68 which are located in this order from the groove member 64 toward the reservoir 62, and are classified by function. In other words, the first layer 66, the second layer 67 and the third layer 68 are disposed between the groove member 64 and the reservoir 62.

It should be noted that in the present embodiment, the wick 65 is integrated by sintering in the state in which the first layer 66, the second layer 67 and the third layer 68 are stacked on one another.

Configuration of Third Layer

Here the third layer 68 located on the reservoir 62 side in the wick 65 will be described in advance.

The third layer 68 is a plate-like porous body soaked with the working fluid in the liquid phase. The third layer 68 is a liquid transport layer for suctioning the working fluid WF in the liquid phase retained in the reservoir 62 with the capillary force to retain the working fluid WF in the liquid phase, and then transporting the working fluid WF in the liquid phase toward the first layer 66. The third layer 68 is formed of the porous body high in void ratio in order to efficiently perform the transportation of the working fluid in the liquid phase from the reservoir 62 to the first layer 66 via the second layer 67.

Here, when the heat has been transferred from the third layer 68 to the reservoir 62, the possibility that the heat leak occurs increases. The heat leak is a phenomenon that the temperature of the working fluid WF in the liquid phase retained in the reservoir 62 rises to raise the pressure in the evaporator 6, and thus, the phase change of the working fluid from the liquid phase to the vapor phase becomes difficult to occur. When such heat leak occurs, the cooling efficiency of the cooling target decreases. Because of such a problem, in order to prevent the heat leak from occurring, the third layer 68 is required to have relatively low thermal conductivity.

To deal with the above, the third layer 68 is formed of a material having the thermal conductivity lower than the thermal conductivity of the first layer 66, or formed so as be higher in thermal resistance than the first layer 66. It should be noted that even when the third layer 68 is formed of a material having the same thermal conductivity as the thermal conductivity of the first layer 66, the thermal resistance of the third layer 68 can be made higher than the thermal resistance of the first layer 66 by making the dimension in the +E1 direction of the third layer 68 larger than the dimension in the +E1 direction of the first layer 66.

Thus, the heat becomes difficult to be transferred to the working fluid WF in the liquid phase retained in the reservoir 62, and thus, the heat leak described above is prevented from occurring.

Configuration of First Layer

The first layer 66 is a plate-like porous body soaked with the working fluid in the liquid phase. The first layer 66 is a connecting layer to be connected to the end surface 64A of the groove member 64, and the working fluid in the liquid phase is transported from the third layer 68 to the first layer 66 via the second layer 67. In the present embodiment, the first layer 66 as the connecting layer has contact with the end surface 64A of the groove 64.

The first layer 66 is formed of metal relatively high in heat transfer rate such as copper or stainless steel, and the heat is transferred to the first layer 66 from the groove member 64. Therefore, it is possible for the first layer 66 to change the phase of the working fluid in the liquid phase having been transported from the third layer 68 to the vapor phase to generate the working fluid in the vapor phase in the inside of the first layer 66.

The first layer 66 has an end surface 66A on the +E1 direction side as the second layer 67 side, an end surface 66B on the −E1 direction side as the groove member 64 side, and a plurality of first apertures 661 disposed along the plurality of flow channels 641, and penetrating the first layer 66 in the +E1 direction.

The end surface 66A has contact with the second layer 67, and the end surface 66B has contact with the end surface 64A of the groove member 64.

The plurality of first apertures 661 is formed so as to correspond to the plurality of flow channels 641, and extends in the +E2 direction similarly to the plurality of flow channels 641. In the detailed description, as shown in FIG. 6, the first apertures 661 are each formed to have a substantially rectangular shape having long sides along the +E2 direction when viewed from the +E1 direction. Further, as shown in FIG. 7, a center line of the first aperture 661 parallel to the +E1 direction, namely a center line passing through the center of the short side of the first aperture 661, coincides with a center line CL passing through the center of the groove width of corresponding one of the flow channels 641 when viewed from the −E2 direction. It should be noted that the shape of the first aperture 661 is not limited to the substantially rectangular shape, but can arbitrarily be changed.

Figure 8:
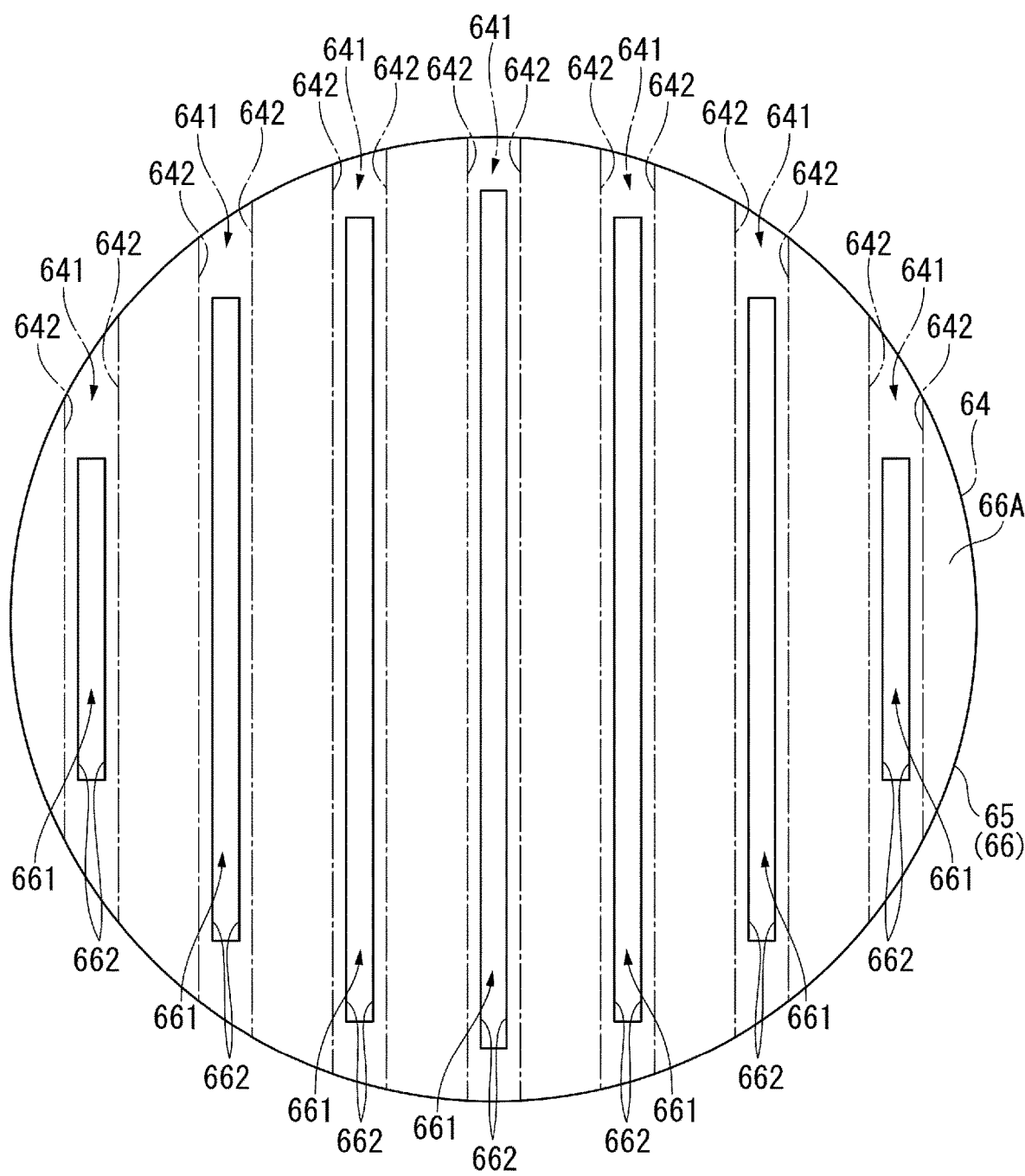
FIG. 8 is a diagram showing a positional relationship between first apertures and flow channels of a groove member in the embodiment.

FIG. 8 is a diagram showing a positional relationship between first apertures 661 and flow channels 641. In other words, FIG. 8 is a plan view of the first layer 66 stacked on the groove member 64 when viewed from the +E1 direction. It should be noted that the flow channels 641 are represented by dashed-dotted lines in FIG. 8.

As shown in FIG. 8, the dimension in the +E3 direction as an aperture width of the first aperture 661 is smaller than the dimension in the +E3 direction as a groove width of corresponding one of the flow channels 641.

Therefore, two end edges 662 which form the first aperture 661, and are opposed to each other in the +E3 direction are located inside the flow channel 641 when viewed from the +E1 direction. In other words, the two end edges 662 forming the first aperture 661 are located on the inner side of two end edges 642 which form the flow channel 641 corresponding to the first aperture 661, and are opposed to each other in the +E3 direction.

Configuration of Second Layer

The second layer 67 is a plate-like porous body soaked with the working fluid in the liquid phase. As shown in FIG. 6 and FIG. 7, the second layer 67 is an intermediate layer located between the first layer 66 and the third layer 68. The second layer 67 transports the working fluid in the liquid phase having been transported from the third layer 68 to the first layer 66. In order to efficiently transport the working fluid in the liquid phase having been transported from the third layer 68 to the first layer 66, the second layer 67 is formed of a porous body having elasticity with which the second layer 67 can adhere to the first layer 66 and the third layer 68.

Further, the second layer 67 has a function of blocking the heat having been transferred to the first layer 66 so as not to be transferred to the third layer 68. In other words, the second layer 67 has lower thermal conductivity than the thermal conductivity of the first layer 66.

Besides the above, in order to prevent the vapor generated in the first layer 66 from flowing toward the third layer 68, the void ratio of the second layer 67 is lower than the void ratio of the first layer 66.

The second layer 67 has an end surface 67A on the +E1 direction side as the third layer 68 side, an end surface 67B on the −E1 direction side as the first layer 66 side, and a plurality of second apertures 671 penetrating the second layer 67 in the +E1 direction.

The end surface 67A has contact with an end surface 68B on the −E1 direction side in the third layer 68, and the end surface 67B has contact with the end surface 66A of the first layer 66.

According to the above, in the vapor generator 63, there are disposed the groove member 64 as the flow channel forming layer, the first layer 66 as the connecting layer, the second layer 67 as the intermediate layer and the third layer 68 as the liquid transport layer in this order toward the reservoir 62 as the reservoir. Further, the thermal conductivity of the first layer 66 is higher than the thermal conductivity of the second layer 67 and the thermal conductivity of the third layer 68.

Figure 9:
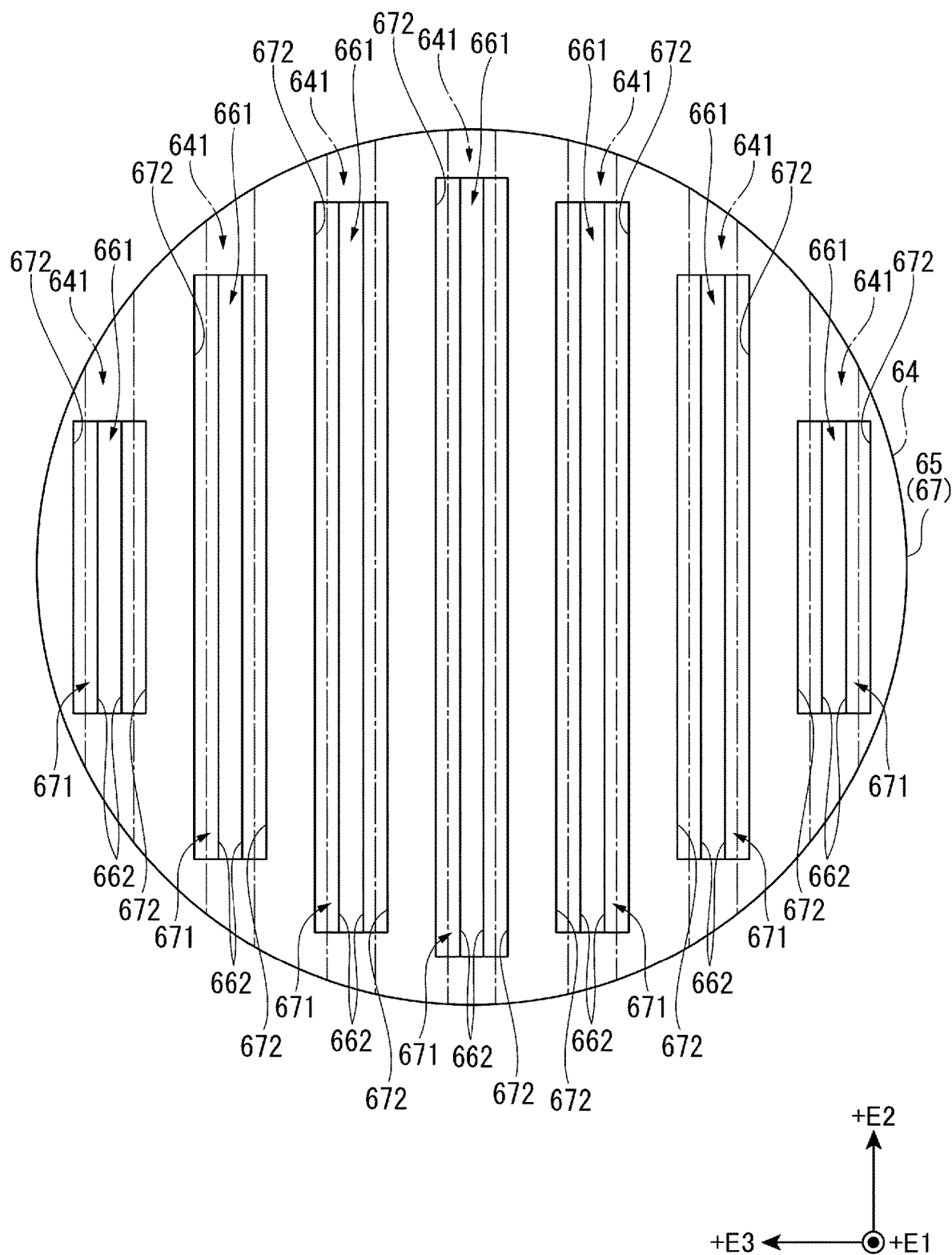
FIG. 9 is a diagram showing a positional relationship between second apertures and the first apertures in the embodiment.

FIG. 9 is a diagram showing a positional relationship between the second apertures 671 and the first apertures 661. In other words, FIG. 9 is a plan view of the second layer 67 stacked on the first layer 66 when viewed from the +E1 direction. It should be noted that the flow channels 641 are represented by the dashed-dotted lines in FIG. 9.

As shown in FIG. 9, the second apertures 671 are formed at the positions corresponding respectively to the first apertures 661 so as to be larger in aperture area than the corresponding first apertures 661. In the detailed description, the dimension of the second aperture 671 is the same as the dimension of the first aperture 661 in the +E2 direction, but the dimension of the second aperture 671 is larger than the dimension of the first aperture 661 in the +E3 direction. However, in the +E2 direction, the dimension of the second aperture 671 is not limited to be the same as the dimension of the first aperture 661, but can also be larger than the dimension of the first aperture 661.

Further, as shown in FIG. 7, a center line of the second aperture 671 parallel to the +E1 direction, namely a center line passing through the center of the short side of the second aperture 671, coincides with the center line CL described above when viewed from the −E2 direction.

Therefore, the second aperture 671 is formed so that the two end edges 662 of the first aperture 661 are located inside the second aperture 671 when viewed from the +E1 direction.

In contrast, two end edges 672 which form the second aperture 671 and are opposed to each other in the +E3 direction are located inside corresponding one of the first apertures 661 as shown in FIG. 7 and FIG. 9. This is for ensuring the area of the end surface 66A of the first layer 66 exposed inside the second aperture 671. On the other hand, the end edges 672 are not necessarily required to be located outside corresponding one of the flow channels 641 when viewed from the +E1 direction.

Although described later in detail, flow channels for the working fluid having changed to one in the vapor phase on the end surface 66A of the first layer 66 to flow into the flow channels 641 are each formed by such a second aperture 671 together with the first aperture 661.

It should be noted that it is possible for the second layer 67 to have a configuration in which recessed openings which are disposed so as to correspond to the first apertures 661, and open toward the first layer 66 are provided to the second layer 67 instead of the second apertures 671. Also in this case, it is possible to make the working fluid having been changed to one in the vapor phase on the end surface 66A flow from the recessed openings into the corresponding flow channels 641 via the first apertures 661.

Operation of Vapor Generator

Figure 10:
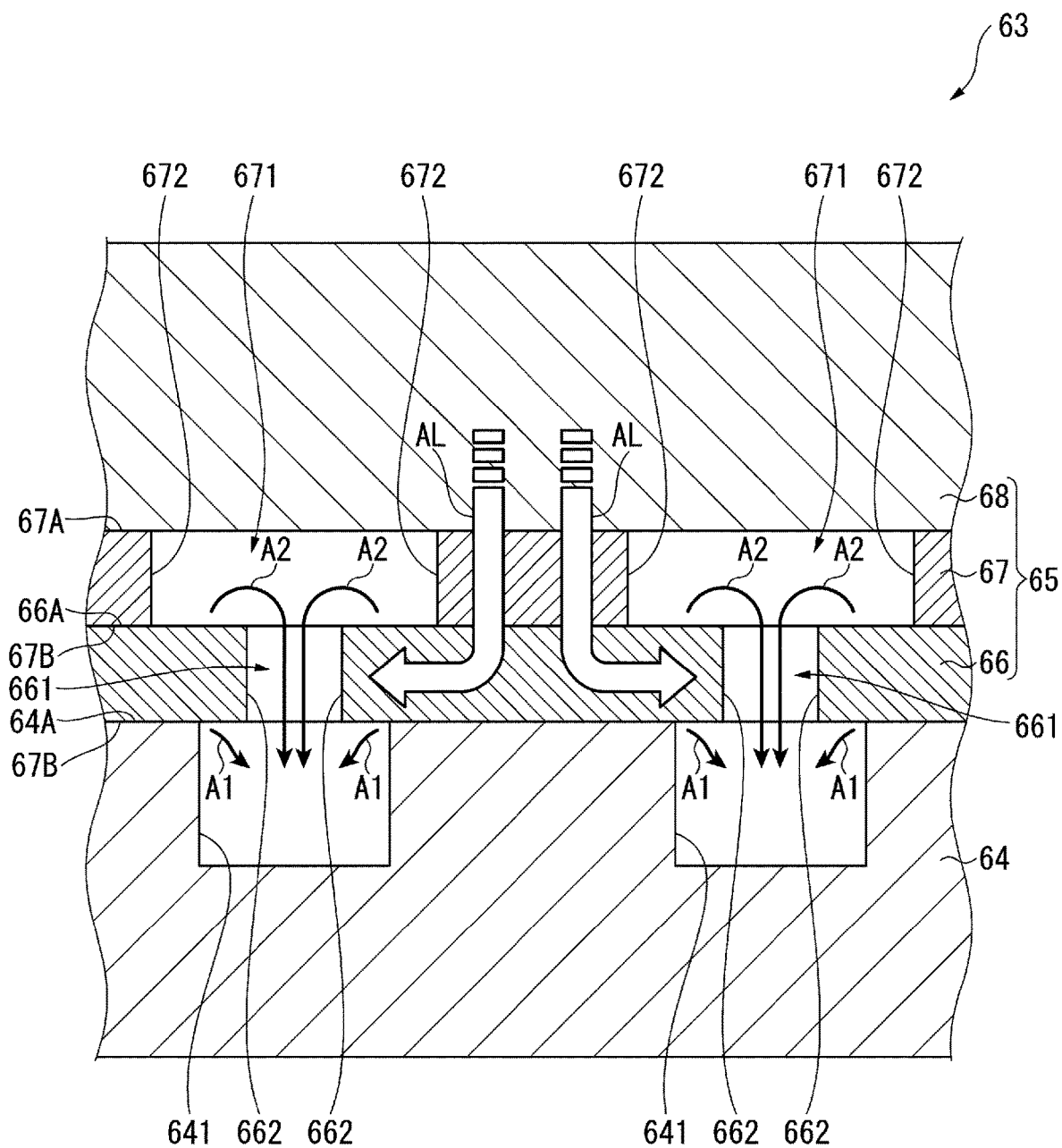
FIG. 10 is a cross-sectional view showing apart of the vapor generator in the embodiment in an enlarged manner.

FIG. 10 is a cross-sectional view showing a part of the vapor generator 63 in an enlarged manner, and is a diagram for explaining how the working fluid having been changed to one in the vapor phase in the vapor generator 63 flows into the flow channels 641.

Hereinafter, the generation process and the discharge process of the vapor by the vapor generator 63 will be described.

The working fluid in the liquid phase retained in the reservoir 62 is transported from the third layer 68 to the first layer 66 via the second layer 67. Meanwhile, the groove member 64 and the first layer 66 change the working fluid in the liquid phase having been transported to the working fluid in the vapor phase with the heat transferred from the cooling target via the heat receiving member 613. The region where such a phase change of the working fluid occurs is thought to change with the transfer state of the heat to the groove member 64 and the first layer 66.

In the present embodiment, when the working fluid in the liquid phase has been transported on the surfaces of the flow channels 641 of the groove member 64 via the wick 65, the phase change of the working fluid to the vapor phase occurs on the surfaces of the flow channels 641. In this case, the working fluid in the vapor phase generated inflows into the vapor pipe 52 through the flow channels 641, and then flows into the condenser 7 through the vapor pipe 52.

In contrast, when the amount of the heat having been transferred from the cooling target to the heat receiving member 613 is relatively large, and the amount of the heat having been transferred from the groove member 64 to the first layer 66 is relatively large, the phase change of the working fluid to the vapor phase occurs in the first layer 66. In this case, since the working fluid in the liquid phase fails to reach the surfaces of the flow channels 641, it is conceivable that the phase change on the surfaces of the flow channels 641 does not occur.

In this case, the working fluid having changed to one in the vapor phase in a region on the −E1 direction side in the vicinity of the first aperture 661 in the first layer 66, namely a region exposed in the flow channel 641 in the end surface 66B on the −E1 direction side in the first layer 66, inflows into the flow channel 641 as indicated by the arrows A1 in FIG. 10.

Further, the working fluid having changed to one in the vapor phase in a region on the +E1 direction side in the vicinity of the first aperture 661 in the first layer 66, namely a region exposed in the second aperture 671 in the end surface 66A on the +E1 direction side in the first layer 66, passes through the first aperture 661 from the second aperture 671 to inflow into the flow channel 641 as indicated by the arrows A2 in FIG. 10.

Then, the working fluid in the vapor phase having flowed into the flow channels 641 inflows into the vapor pipe 52, and then flows into the condenser 7 through the vapor pipe 52 similarly to the above.

According to the evaporator 6 provided with such a vapor generator 63, it is possible to make it easy to make the working fluid having been changed in phase from the liquid phase to the vapor phase in the groove member 64 or the first layer 66 flow through the plurality of flow channels 641 located in the groove member 64. Thus, it is possible to enhance the discharge efficiency of the vapor to the vapor pipe 52, and thus it is possible to make the vapor promptly flow into the condenser 7. Therefore, since it is possible to promptly draw the heat of the light source 411 by the vapor generator 63, and then promptly transfer the heat of the light source 411 to the condenser 7 using the working fluid to radiate the heat of the light source 411, it is possible to efficiently cool the light source 411 as the cooling target.

Advantages of Embodiment

The projector 1 according to the present embodiment described hereinabove exerts the following advantages.

The cooling device 5 is provided with the loop heat pipe 51. The loop heat pipe 51 is provided with the evaporator 6, the condenser 7, the vapor pipe 52 and the liquid pipe 53, wherein the evaporator 6 evaporates the working fluid in the liquid phase with the heat transferred from the light source 411 as the cooling target to thereby change to the working fluid in the vapor phase, the condenser 7 condenses the working fluid in the vapor phase to thereby change to the working fluid in the liquid phase, the vapor pipe 52 makes the working fluid having changed in the evaporator 6 to one in the vapor phase flow into the condenser 7, and the liquid pipe 53 makes the working fluid having changed in the condenser 53 to one in the liquid phase flow into the evaporator 6. The evaporator 6 has the housing 61, the reservoir 62, the wick 65 and the groove member 64, wherein the housing 61 is connected to the liquid pipe 53, the working fluid in the liquid phase flows into the housing 61, the reservoir 62 as the reservoir for retaining the working fluid in the liquid phase having flowed into the reservoir is disposed inside the housing 61, the wick 65 is disposed inside the housing 61, soaked with the working fluid in the liquid phase, and retains the working fluid in the liquid phase, and the groove member 64 has the plurality of flow channels 641 through which the working fluid having changed in phase from the liquid phase to the vapor phase flows, and is connected to the wick 65. The wick 65 has the first layer 66, the second layer 67 and the third layer 68 disposed between the groove member 64 and the reservoir 62 in this order from the groove member 64 toward the reservoir 62. The first layer 66 has the plurality of first apertures 661 disposed along the plurality of flow channels 641, and has the higher thermal conductivity than the thermal conductivity of the second layer 67 and the thermal conductivity of the third layer 68. The third layer 68 transports the working fluid in the liquid phase retained in the reservoir 62 to the second layer 67. The second layer 67 has the plurality of second apertures 671 disposed so as to correspond to the plurality of first apertures 661, and each larger in aperture area than corresponding one of the first apertures 661, and the working fluid in the liquid phase having been transported from the third layer 68 is transported by the second layer 67 to the first layer 66.

According to such a configuration, since the second layer 67 and the third layer 68 constituting the wick 65 has the lower thermal conductivity than the thermal conductivity of the first layer 66 also constituting the wick 65, it is possible to make it difficult to transfer the heat from the groove member 64 to the reservoir 62 via the wick 65. Therefore, it is possible to prevent the heat leak described above from occurring, and thus, it is possible to prevent the cooling efficiency of the light source 411 as the cooling target from decreasing.

Further, the working fluid having changed in phase from the liquid phase to the vapor phase in the region in the vicinity of the first aperture 661 in the first layer 66 directly flows into the flow channel 641 of the groove member 64, and in addition, flows into the flow channel 641 via the second aperture 671 and the first aperture 661. According to this configuration, it is possible to make the working fluid having been changed to one in the vapor phase in the first layer 66 having contact with the groove member 64 promptly flow into the flow channel 641 to thereby increase the discharge efficiency of the working fluid in the vapor phase to the vapor pipe 52. Therefore, since it is possible to prevent the pressure loss from occurring in the evaporator 6, and in addition, it is possible to promptly transfer the heat of the light source 411 to the condenser 7 to radiate the heat of the light source 411, it is possible to enhance the cooling efficiency of the light source 411 as the cooling target.

The second layer 67 having contact with the first layer 66 and the third layer 68 has elasticity. According to this configuration, it is possible to make it easy to keep the state of having contact with the first layer 66 and the third layer 68, and thus, it is possible to efficiently transport the working fluid in the liquid phase from the third layer 68 to the first layer 66 via the second layer 67. Therefore, it is possible to promptly transfer the heat of the cooling target to the condenser 7 using the working fluid, and thus, it is possible to enhance the cooling efficiency of the light source 411 as the cooling target.

The void ratio of the second layer 67 is lower than the void ratio of the first layer 66.

According to this configuration, it is possible to prevent the working fluid having changed to one in the vapor phase in the first layer 66, namely the vapor, from flowing into the third layer 68. Therefore, also in this regard, it is possible to prevent the heat leak described above from occurring.

As described above, the first layer 66 has the higher thermal conductivity than the thermal conductivity of the second layer 67 and the thermal conductivity of the third layer 68. Such high thermal conductivity of the first layer 66 is realized by the fact that the heat transfer rate of the material constituting the first layer 66 is higher than the heat transfer rate of the material constituting the second layer 67 and the heat transfer rate of the material constituting the third layer 68. Alternatively, the high thermal conductivity of the first layer 66 is realized by the fact that the heat transfer rate of the first layer 66 is higher than the heat transfer rate of the second layer 67, and the thermal resistance of the first layer 66 is lower than the thermal resistance of the third layer 68. It should be noted that when the heat transfer rate of the first layer 66 and the heat transfer rate of the third layer 68 are the same, the fact that the thermal resistance of the first layer 66 is lower than the thermal resistance of the third layer 68 is realized by making the dimension in the +E1 direction in the third layer 68 larger than the dimension in the +E1 direction in the first layer 66.

According to this configuration, since it is possible to make it difficult to transfer the heat from the third layer 68 to the reservoir 62, it is possible to prevent the heat leak described above from occurring, on the one hand, and it is possible to make it easy to transfer the heat to the first layer 66. Therefore, it is possible to make it easy to change the working fluid in phase from the liquid phase to the vapor phase in the first layer 66. Therefore, it is possible to further enhance the cooling efficiency of the cooling target.

The cooling device 5 is equipped with the loop heat pipe 51, and the loop heat pipe 51 is provided with the evaporator 6, the condenser 7, the vapor pipe 52 and the liquid pipe 53 described above. The evaporator 6 has the housing 61, the reservoir 62 and the vapor generator 63, wherein the housing 61 is connected to the liquid pipe 53, the working fluid in the liquid phase inflows into the housing 61, the reservoir 62 retains the working fluid in the liquid phase having flowed into the housing 61, and the vapor generator 63 evaporates the working fluid in the liquid phase having been supplied from the reservoir 62. The vapor generator 63 has the groove member 64 as the flow channel forming layer, the first layer 66 as the connecting layer, the second layer 67 as the intermediate layer and the third layer 68 as the liquid transport layer in this order toward the reservoir 62. The groove member 64 has a plurality of flow channels 641 through which the working fluid having changed in phase from the liquid phase to the vapor phase flows, and which is communicated with the vapor pipe 52. The first layer 66 as the connecting layer has the plurality of first apertures 661 disposed along the plurality of flow channels 641, and has the higher thermal conductivity than the thermal conductivity of the second layer 67 and the thermal conductivity of the third layer 68, and is connected to the groove member 64 as the flow channel forming layer. The third layer 68 transports the working fluid in the liquid phase retained in the reservoir 62 to the second layer 67. The second layer 67 has the plurality of second apertures 671 disposed so as to correspond to the plurality of first apertures 661, and each larger in aperture area than corresponding one of the first apertures 661, and the working fluid in the liquid phase transported from the third layer 68 is transported by the second layer 67 to the first layer 66.

According to such a configuration, as described above, it is not only possible to prevent the heat leak from occurring, but also possible to promptly discharge the working fluid having been changed to one in the vapor phase in the first layer 66 as the connecting layer to the vapor pipe 52. Therefore, it is possible to promptly transfer the heat of the light source 411 to the condenser 7 to discharge the heat of the light source 411, and thus, it is possible to enhance the cooling efficiency of the light source 411 as the cooling target.

The condenser 7 has the vapor flow channel 72, the plurality of fine flow channels 73, and the liquid flow channel 74, wherein the working fluid in the vapor phase from the vapor pipe 52 flows through the vapor flow channel 72, the plurality of fine flow channels 73 is connected to the vapor flow channel 72, and is smaller in flow channel cross-sectional area than the vapor flow channel 72, and the liquid flow channel 74 is connected to the plurality of fine flow channels 73, and guides the working fluid having been changed to one in the liquid phase and inflowing from the plurality of fine flow channels 73 to the liquid pipe 53.

According to this configuration, since it is possible to enlarge the contact area between the condenser 7 and the working fluid in the vapor phase due to the plurality of fine flow channels 73, it is possible to promptly and continuously transfer the heat from the working fluid in the vapor phase to the condenser 7 by making the working fluid in the vapor phase flow through the plurality of fine flow channels 73.

Therefore, it is possible to efficiently make the phase change of the working fluid from the vapor phase to the liquid phase.

The liquid flow channel 74 has the first flow channel 741 and the second flow channel 742. The first flow channel 741 has the first extending part 7411, the folding-back part 7413 and the second extending part 7412, wherein the first extending part 7411 is connected to the plurality of first fine flow channels 731 included in the plurality of fine flow channels 73, the working fluid in the liquid phase flows through the first extending part 7411 in the −D1 direction as the opposite direction to the flow direction of the working fluid in the vapor phase in the vapor flow channel 72, the folding-back part 7413 is disposed in the end part on the downstream in the flow direction of the working fluid in the first extending part 7411, the folding-back part 7413 reverses the flow direction of the working fluid in the liquid phase, the second extending part 7412 is connected to the folding-back part 7413, and the working fluid in the liquid phase having flowed through the first extending part 7411 flows through the second extending part 7412 via the folding-back part 7413. The same applies to the second flow part 742.

According to this configuration, since the flow direction of the working fluid in the vapor phase in the vapor flow channel 72 and the flow direction of the working fluid in the liquid phase in the first extending part 7411 are opposite to each other, it is possible to substantially homogenize the overall temperature of the condenser 7. Thus, it is possible to prevent a local high-temperature region from occurring in the condenser 7, and in addition, it is possible to enhance the cooling efficiency of the condenser 7 with the cooling gas made to flow by the cooling fan 54. Therefore, it is possible to enhance the cooling efficiency of the working fluid by the condenser 7.

Besides the above, since the first flow channel 741 and the second flow channel 742 have the first extending parts 7411, 7421 and the folding-back parts 7413, 7423, respectively, it is possible to reduce the size of the condenser 7 while enlarging the contact area with the working fluid in the liquid phase by elongating the flow channel of the working fluid in the liquid phase.

The projector 1 is provided with the light source device 4, the light modulation devices 343 and the projection optical device 36, wherein the light source device 4 has the light source 411 for emitting the light, the light modulation devices 343 each modulate the light emitted from the light source device 4, and the projection optical device 36 projects the light modulated by the light modulation devices 343, and in addition, provided with the cooling device 5 described above. Further, the cooling target of the cooling device 5 is the light source 411.

According to this configuration, it is possible to exert the advantages due to the cooling device 5. Besides the above, since it is possible to enhance the cooling efficiency of the light source 411, it is possible to stably drive the light source device 4, and by extension, it is possible to stably perform the image projection.

MODIFICATIONS OF EMBODIMENT

The present disclosure is not limited to the embodiment described above, but includes modifications, improvements, and so on in the range where the advantages of the present disclosure can be achieved.

In the embodiment described above, the wick 65 is assumed to have the configuration having the first layer 66, the second layer 67 and the third layer 68. At least one of the first layer 66, the second layer 67 and the third layer 68 is not required to be a layer formed of a single material, or a layer having a single structure, and can also be a layer formed of a plurality of layers different in material from each other or different in structure from each other.

In the embodiment described above, it is assumed that the vapor generator 63 is provided with the groove member 64 as the flow channel forming layer and the wick 65 located between the groove member 64 and the reservoir 62 as the reservoir, and the wick 65 has the first layer 66 as the connecting layer, the second layer 67 as the intermediate layer, and the third layer 68 as the liquid transport layer. As long as the vapor generator has these layers, which member has which layer does not matter. For example, it is also possible for the groove member 64, the first layer 66, the second layer 67 and the third layer 68 to be integrated with each other by sintering or the like, and further, for example, it is also possible for the groove member 64 and the first layer 66 to be integrated with each other, or it is possible for the second layer 67 and the third layer 68 to be integrated with each other.

In the embodiment described above, it is assumed that when viewing the flow channels 641 of the groove member 64 as the flow channel forming layer, the first apertures 661 of the first layer 66 as the connecting layer, and the second apertures 671 of the second layer 67 as the intermediate layer from the +E2 direction, the center lines thereof parallel to the +E1 direction and passing through the respective centers in the +E3 direction coincide with each other. However, this is not a limitation, and as long as the working fluid having changed to one in the vapor phase in the end surface 66A in the +E1 direction in the first layer 66 can flow into the flow channels 641 via the second apertures 671 and the first apertures 661, the centers of the flow channel 641, the first aperture 661 and the second aperture 671 corresponding to each other can also be shifted from each other in at least either of the +E2 direction and the +E3 direction.

In the embodiment described above, it is assumed that the second layer 67 is formed of the porous body having elasticity in order to enhance the degree of adhesion between the first layer 66 and the third layer 68. However, this is not a limitation, and providing the second layer 67 can adhere to the first layer 66 and the third layer 68 by, for example, pressing the wick 65 against the groove member 64, the second layer 67 is not required to have elasticity.

Further, it is assumed that the void ratio of the second layer 67 is lower than the void ratio of the first layer 66. However, this is not a limitation, and the void ratios of the respective layers 66 through 68 can arbitrarily be set.

In the embodiment described above, it is assumed that the first layer 66 has the higher thermal conductivity than the thermal conductivity of the second layer 67 and the thermal conductivity of the third layer 68. In order to provide such high thermal conductivity to the first layer 66, the heat transfer rate of the first layer 66 is set higher than the heat transfer rate of the second layer 67 and the heat transfer rate of the third layer 68. Alternatively, in order to provide the high thermal conductivity to the first layer 66, the heat transfer rate of the first layer 66 is made higher than the heat transfer rate of the second layer 67, and the thermal resistance of the first layer 66 is made lower than the thermal resistance of the third layer 68. Further, when the first layer 66 and the third layer 68 are formed of respective materials having the same heat transfer rate, the dimension in the +E1 direction of the third layer 68 is made larger than the dimension in the +E1 direction of the first layer 66 in order to make the thermal resistance of the first layer 66 lower than the thermal resistance of the third layer 68. However, this is not a limitation, and providing the higher thermal conductivity than the thermal conductivity of the second layer 67 and the thermal conductivity of the third layer 68 can be provided to the first layer 66, the method thereof does not matter.

In the embodiment described above, it is assumed that the condenser 7 is provided with the main body part 71 having the vapor flow channel 72, the plurality of fine flow channels 73 and the liquid flow channel 74. However, this is not a limitation, and providing the working fluid in the vapor phase inflowing from the vapor pipe 52 can be condensed to thereby be changed to the working fluid in the liquid phase, and then discharged to the liquid pipe 53, the configuration of the condenser 7 does not matter. For example, the condenser can also be provided with a configuration in which the flow channel through which the working fluid flows is folded back at least once.

In the embodiment described above, it is assumed that the heat receiving member 613 for making it easy to transfer the heat having been generated in the light source 411 to the groove member 64 is disposed between the support member 414 of the light source 411 as the cooling target and the groove member 64. However, this is not a limitation, and it is also possible for the support member 414 and the groove member 64 to be connected to each other so as to be able to transfer heat without the intervention of the heat receiving member 613.

In the embodiment described above, it is assumed that the light source 411 of the light source device 4 has the semiconductor lasers 412, 413. However, this is not a limitation, and it is also possible for the light source device to be a device having a light source lamp such as a super-high pressure mercury lamp, or other solid-state light sources such as light emitting diodes (LED) as the light source. In this case, the cooling target of the loop heat pipe 51 can also be the light source lamp or other solid-state light sources.

In the embodiment described above, it is assumed that the projector 1 is equipped with the three light modulation devices 343 (343B, 343G and 343R). However, this is not a limitation, and the present disclosure can also be applied to a projector equipped with two or less, or four or more light modulation devices.

In the embodiment described above, it is assumed that the light modulation devices 343 are each the transmissive liquid crystal panel having the plane of incidence of light and the light exit surface different from each other. However, this is not a limitation, and it is also possible to use reflective liquid crystal panels having the plane of incidence of light and the light exit surface coinciding with each other as the light modulation devices. Further, it is also possible to use a light modulation device other than the liquid crystal device, such as a device using a micromirror such as a digital micromirror device (DMD) providing the light modulation device is capable of modulating the incident light beam to form the image corresponding to the image information.

In the embodiment described above, there is cited an example of applying the cooling device 5 equipped with the loop heat pipe 51 to the projector. However, this is not a limitation, and the cooling device according to the present disclosure can also be applied to other devices or equipment than the projector, and in addition, can also be used alone. In other words, the application of the cooling device according to the present disclosure is not limited to a device for cooling the constituents of the projector.

What is claimed is:

1. A cooling device comprising:
an evaporator configured to evaporate working fluid in a liquid phase with a heat transferred from a cooling target to change to the working fluid in a vapor phase;
a condenser configured to condense the working fluid in the vapor phase to change to the working fluid in the liquid phase;
a vapor pipe configured to flow the working fluid changed in phase to the vapor phase in the evaporator into the condenser; and
a liquid pipe configured to flow the working fluid changed in phase to the liquid phase in the condenser flow into the evaporator, wherein:
the evaporator includes
a housing connected to the liquid pipe, the housing into which the working fluid in the liquid phase inflows, the housing having a reservoir configured to retain the working fluid in the liquid phase flowed into the housing,
a wick disposed in the housing, the wick soaked with the working fluid in the liquid phase to retain the working fluid in the liquid phase, and
a groove member having a plurality of flow channels through which the working fluid changed in phase from the liquid phase to the vapor phase flows, the groove member connected to the wick,
the wick has a first layer, a second layer and a third layer disposed between the groove member and the reservoir in this order from the groove member toward the reservoir,
the first layer has a plurality of first apertures disposed along the plurality of flow channels, and has higher thermal conductivity than both thermal conductivity of the second layer and thermal conductivity of the third layer,
the third layer transports the working fluid in the liquid phase retained in the reservoir to the second layer,
the second layer has a plurality of second apertures disposed so as to correspond to the plurality of first apertures, the second apertures having aperture area larger than corresponding one of the first apertures, and
the second layer transports the working fluid in the liquid phase transported from the third layer to the first layer.

2. The cooling device according to claim 1, wherein the second layer has elasticity.

3. The cooling device according to claim 1, wherein a void ratio of the second layer is lower than a void ratio of the first layer.

4. The cooling device according to claim 1, wherein the first layer has the higher thermal conductivity than both the thermal conductivity of the second layer and the thermal conductivity of the third layer by a heat transfer rate of the first layer being higher than both a heat transfer rate of the second layer and a heat transfer rate of the third layer.

5. The cooling device according to claim 1, wherein the first layer has the higher thermal conductivity than both the thermal conductivity of the second layer and the thermal conductivity of the third layer by a heat transfer rate of the first layer being higher than a heat transfer rate of the second layer, and a thermal resistance of the first layer being lower than a thermal resistance of the third layer.

6. The cooling device according to claim 1, wherein the condenser includes
a vapor flow channel through which the working fluid in the vapor phase flows from the vapor pipe, a plurality of fine flow channels connected to the vapor flow channel, the fine flow channels smaller in flow channel cross-sectional area than the vapor flow channel, and a liquid flow channel connected to the plurality of fine flow channels to guide, to the liquid pipe, the working fluid changed in phase to the liquid phase inflowing from the plurality of fine flow channels.

7. The cooling device according to claim 6, wherein the liquid flow channel includes a first extending part connected to the plurality of fine flow channels, the first extending part through which the working fluid in the liquid phase flows in an opposite direction to a flow direction of the working fluid in the vapor phase in the vapor flow channel, a folding-back part disposed in an end part on a downstream in a flow direction of the working fluid in the first extending part, the folding-back part configured to reverse the flow direction of the working fluid in the liquid phase, and a second extending part connected to the folding-back part, the second extending part through which the working fluid in the liquid phase flowed through the first extending part flows via the folding-back part.

8. A projector comprising:
a light source configured to emit light;
a light modulator configured to modulate the light emitted from the light source;
a projection optical device configured to project the light modulated by the light modulator; and
the cooling device according to claim 1.

9. A cooling device comprising:
an evaporator configured to evaporate working fluid in a liquid phase with a heat transferred from a cooling target to change to the working fluid in a vapor phase;
a condenser configured to condense the working fluid in the vapor phase to change to the working fluid in the liquid phase;
a vapor pipe configured to flow the working fluid changed in phase to the vapor phase in the evaporator into the condenser; and
a liquid pipe configured to flow the working fluid changed in phase to the liquid phase in the condenser into the evaporator, wherein:
the evaporator includes
a housing connected to the liquid pipe, the housing into which the working fluid in the liquid phase inflows, the housing having a reservoir configured to retain the working fluid in the liquid phase flowed into the housing, and
a vapor generator configured to evaporate the working fluid in the liquid phase supplied from the reservoir,
the vapor generator has a flow channel forming layer, a connecting layer, an intermediate layer and a liquid transport layer disposed in this order toward the reservoir,
the flow channel forming layer has a plurality of flow channels through which the working fluid changed in phase from the liquid phase to the vapor phase flows, the flow channels communicated with the vapor pipe,
the connecting layer has a plurality of first apertures disposed along the plurality of flow channels, the connecting layer having higher thermal conductivity than both thermal conductivity of the intermediate layer and thermal conductivity of the liquid transport layer, the connecting layer connected to the flow channel forming layer,
the liquid transport layer transports the working fluid in the liquid phase retained in the reservoir to the intermediate layer,
the intermediate layer has a plurality of second apertures disposed so as to correspond to the plurality of first apertures, the second apertures having aperture area larger than corresponding one of the first apertures, and
the intermediate layer transports the working fluid in the liquid phase transported from the liquid transport layer to the connecting layer.

10. The cooling device according to claim 9, wherein the condenser includes a vapor flow channel through which the working fluid in the vapor phase flows from the vapor pipe, a plurality of fine flow channels connected to the vapor flow channel, the fine flow channels smaller in flow channel cross-sectional area than the vapor flow channel, and a liquid flow channel connected to the plurality of fine flow channels to guide, to the liquid pipe, the working fluid changed in phase to the liquid phase inflowing from the plurality of fine flow channels.

11. The cooling device according to claim 10, wherein the liquid flow channel includes a first extending part connected to the plurality of fine flow channels, the first extending part through which the working fluid in the liquid phase flows in an opposite direction to a flow direction of the working fluid in the vapor phase in the vapor flow channel, a folding-back part disposed in an end part on a downstream in a flow direction of the working fluid in the first extending part, the folding-back part configured to reverse the flow direction of the working fluid in the liquid phase, and a second extending part connected to the folding-back part, the second extending part through which the working fluid in the liquid phase flowed through the first extending part flows via the folding-back part.

12. The projector according to claim 10, wherein the cooling target is the light source.

13. A projector comprising:
a light source configured to emit light;
a light modulator configured to modulate the light emitted from the light source;
a projection optical device configured to project the light modulated by the light modulator; and
the cooling device according to claim 9.

14. The projector according to claim 13, wherein the cooling target is the light source.

* * * * *